(12) United States Patent
Takizawa et al.

(10) Patent No.: US 10,630,133 B2
(45) Date of Patent: Apr. 21, 2020

(54) ELECTRIC DRIVING APPARATUS

(71) Applicant: Mitsubishi Electric Corporation, Tokyo (JP)

(72) Inventors: Yuji Takizawa, Tokyo (JP); Satoru Akutsu, Tokyo (JP); Takanori Ichikawa, Tokyo (JP); Shunsuke Fushie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 15/547,890

(22) PCT Filed: Apr. 13, 2015

(86) PCT No.: PCT/JP2015/061359
§ 371 (c)(1),
(2) Date: Aug. 1, 2017

(87) PCT Pub. No.: WO2016/166796
PCT Pub. Date: Oct. 20, 2016

(65) Prior Publication Data
US 2018/0026492 A1    Jan. 25, 2018

(51) Int. Cl.
*H02K 5/15* (2006.01)
*H02K 5/22* (2006.01)
(Continued)

(52) U.S. Cl.
CPC ............ *H02K 5/15* (2013.01); *B62D 5/0406* (2013.01); *H02K 5/00* (2013.01); *H02K 11/00* (2013.01);
(Continued)

(58) Field of Classification Search
CPC .. H02K 5/00; H02K 5/10; H02K 5/15; H02K 5/22; H02K 5/225; H02K 11/00;
(Continued)

(56) References Cited

U.S. PATENT DOCUMENTS

| | | |
|---|---|---|
| 8,348,008 B2 | 1/2013 | Yamaguchi et al. |
| 8,415,845 B2 | 4/2013 | Miyachi et al. |

(Continued)

FOREIGN PATENT DOCUMENTS

| | | |
|---|---|---|
| JP | 2009-296718 A | 12/2009 |
| JP | 2010-112261 A | 5/2010 |

(Continued)

OTHER PUBLICATIONS

International Search Report of PCT/JP2015/061359, dated Jun. 16, 2015. [PCT/ISA/210].

(Continued)

*Primary Examiner* — Tran N Nguyen
(74) *Attorney, Agent, or Firm* — Sughrue Mion, PLLC; Richard C. Turner

(57) ABSTRACT

In an electric driving apparatus, a sensor magnet is fixed to a first end portion of a rotary shaft of a motor. A sensor device includes a rotation sensor that detects a magnetic field generated by the sensor magnet. The rotation sensor opposes the sensor magnet in an axial direction of the rotary shaft. A control unit mounted on the motor includes an inverter circuit that is connected to an armature winding of the motor via a plurality of feeder wires. The inverter circuit is disposed in a position further from the sensor magnet than the rotation sensor in the axial direction of the rotary shaft. A shield plate formed from a magnetic material is disposed between the rotation sensor and the inverter circuit.

7 Claims, 11 Drawing Sheets

(51) Int. Cl.
*H02K 5/00* (2006.01)
*H02K 11/00* (2016.01)
*H02K 29/08* (2006.01)
*H02K 11/215* (2016.01)
*H02K 11/33* (2016.01)
*B62D 5/04* (2006.01)
*H02K 11/23* (2016.01)
*H02K 9/22* (2006.01)

(52) U.S. Cl.
CPC ........... *H02K 11/215* (2016.01); *H02K 11/33* (2016.01); *H02K 29/08* (2013.01); *H02K 9/22* (2013.01); *H02K 11/23* (2016.01)

(58) Field of Classification Search
CPC ...... H02K 11/01; H02K 11/04; H02K 11/046; H02K 11/21; H02K 11/215; H02K 11/24; H02K 11/33; H02K 29/00; H02K 29/08; H02K 29/22; B62D 5/00; B62D 5/04; B62D 5/0406
See application file for complete search history.

(56) References Cited

U.S. PATENT DOCUMENTS

| | | | | |
|---|---|---|---|---|
| 2006/0169526 A1* | 8/2006 | Honbo | ................. | B62D 5/0403 180/444 |
| 2006/0226719 A1* | 10/2006 | Nakanishi | ................. | H02K 7/20 310/68 B |
| 2007/0216240 A1 | 9/2007 | Kikuchi et al. | | |
| 2009/0284105 A1* | 11/2009 | Miyashita | ............ | H02K 5/1732 310/68 B |
| 2011/0254388 A1* | 10/2011 | Yamasaki | ............ | B62D 5/0406 310/43 |
| 2012/0031697 A1* | 2/2012 | Matsuda | ................. | H02K 29/08 180/446 |
| 2014/0009093 A1* | 1/2014 | Suzuki | .................... | H02P 25/22 318/400.02 |
| 2014/0153198 A1* | 6/2014 | Yamasaki | ............ | H05K 7/1432 361/747 |

FOREIGN PATENT DOCUMENTS

| | | |
|---|---|---|
| JP | 2011-229228 A | 11/2011 |
| JP | 2013-009573 A | 1/2013 |
| JP | 5229642 B2 | 7/2013 |
| JP | 2014-14240 A | 1/2014 |
| WO | 2013/105225 A1 | 7/2013 |
| WO | 2014/054098 A1 | 4/2014 |

OTHER PUBLICATIONS

Communication dated Nov. 9, 2018 from the European Patent Office in counterpart application No. 15889134.1.
Communication dated Jul. 10, 2018 from the Japanese Patent Office in counterpart Application No. 2017-512476.
Communication dated Sep. 12, 2019 from the Intellectual Property India in application no. 201747029273.

* cited by examiner

ELECTRIC DRIVING APPARATUS

CROSS REFERENCE TO RELATED APPLICATIONS

This application is a National Stage of International Application No. PCT/JP2015/061359 filed Apr. 13, 2015, the contents of all of which are incorporated herein by reference in their entirety.

TECHNICAL FIELD

This invention relates to an electric driving apparatus in which a control unit is mounted on a motor.

BACKGROUND ART

In a conventional motor, a magnet is mounted on an end portion of a shaft of a rotor, a magnetic sensor is opposed to the magnet on an axis of the shaft, and a rotation angle of the rotor is detected by measuring the magnetism of the magnet using the magnetic sensor, whereupon the motor controls a current supplied to a stator winding. In this type of conventional motor, when a conductor wire through which a current flows, for example, is disposed on the periphery of the magnetic sensor, a noise magnetic field generated by the conductor wire acts on the magnetic sensor, leading to an increase in the likelihood of a detection error occurring when the magnetic sensor detects the magnetism.

In a motor proposed in the prior art with the aim of suppressing detection errors by the magnetic sensor, first and second conductor wires through which currents of the same phase flow are disposed in symmetrical positions relative to the axis of the shaft, with the result that noise magnetic fields generated respectively by the first and second conductor wires cancel each other out in the position of the magnetic sensor (see PTL 1, for example).

In another motor proposed in the prior art with the aim of suppressing detection errors by the magnetic sensor, the magnet and the magnetic sensor are surrounded by a substrate holder made of magnetic metal so that a noise magnetic field from the periphery of the magnetic sensor is blocked by the substrate holder (see PTL 2, for example).

CITATION LIST

Patent Literature

[PTL 1] Japanese Patent No. 5229642
[PTL 2] Japanese Patent Application Publication No. 2013-9573

SUMMARY OF INVENTION

Technical Problem

However, in the motor disclosed in PTL 1, the first and second conductor wires are limited to symmetrical positions relative to the axis of the shaft, and therefore disposal locations and disposal space for other components are restricted, with the result that the design freedom of the motor is restricted. In particular, when the stator winding is a multiplex, multi-phase winding, a large number of conductor wires are connected to the stator winding, and therefore the design freedom of the motor is greatly restricted. Moreover, if the design freedom is not reduced, the disposal locations and disposal space for the other components increase in range, leading to an increase in the size of the motor.

Further, in the motor disclosed in PTL 2, the substrate holder surrounds not only the magnetic sensor but also the magnet, and therefore a rotating magnetic field from the magnet may be distorted by the substrate holder, with the result that a detection error corresponding to a multiple of the rotation order is generated by the magnetic sensor. It is therefore necessary to increase the thickness of the magnet in the axial direction of the shaft of the rotor in order to compensate for a reduction in the intensity of the magnetic field.

This invention has been designed to solve the problems described above, and an object thereof is to obtain an electric driving apparatus with which a reduction in performance can be suppressed while avoiding an increase in size.

Solution to Problem

An electric driving apparatus according to this invention includes: a motor that includes a rotary shaft having a first end portion and a second end portion, a stator that includes an armature winding and is disposed around an axis of the rotary shaft, and a rotor that is fixed to the rotary shaft so as to rotate integrally with the rotary shaft relative to the stator; a sensor magnet fixed to the first end portion; a sensor device that opposes the sensor magnet in an axial direction of the rotary shaft, and includes a rotation sensor for detecting a magnetic field generated by the sensor magnet; and a control unit that is mounted on the motor and includes an inverter circuit connected to the armature winding via a plurality of feeder wires, wherein the inverter circuit is disposed in a position further from the sensor magnet than the rotation sensor in the axial direction of the rotary shaft, and a shield plate formed from a magnetic material is disposed between the rotation sensor and the inverter circuit.

Advantageous Effects of Invention

With the electric driving apparatus according to this invention, noise magnetic fields acting on the rotation sensor from the feeder wires, the inverter circuit, and so on, for example, can be blocked by the shield plate. Moreover, the intensity of the magnetic field generated by the sensor magnet is unlikely to decrease in the position of the rotation sensor. As a result, detection errors by the rotation sensor can be reduced, and a reduction in the performance of the electric driving apparatus can be suppressed. Furthermore, the disposal freedom of the feeder wires can be improved, thereby preventing an increase in the size of the electric driving apparatus.

DESCRIPTION OF EMBODIMENTS

Preferred embodiments of this invention will be described below with reference to the drawings.

First Embodiment

Figure 1:
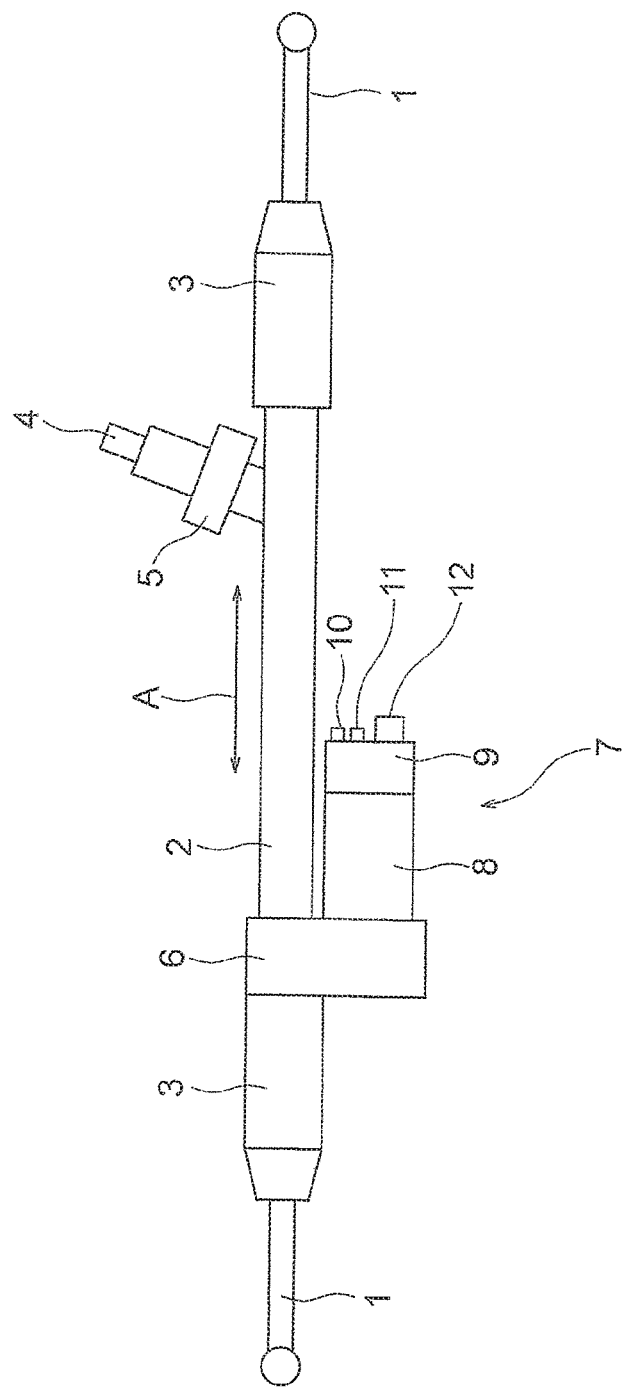
FIG. 1 is a view showing a configuration of an electric power steering apparatus according to a first embodiment of this invention.

FIG. 1 is a view showing a configuration of an electric power steering apparatus according to a first embodiment of this invention. The electric power steering apparatus according to this embodiment is an electric power steering apparatus for a vehicle, which is installed in a vehicle such as an automobile, for example. A rack shaft (not shown) housed in a housing 2 is connected between a pair of tie rods 1. Respective connection portions between the tie rods 1 and the rack shaft are housed in rack boots 3 that prevent foreign matter from infiltrating the electric power steering apparatus. A shaft 4 is connected to the rack shaft. When a driver turns a steering wheel (not shown), steering torque generated as a result is transmitted to the rack shaft via a steering shaft (not shown) and the shaft 4. A torque sensor 5 for detecting the torque generated by turning the steering wheel is provided on the shaft 4. Further, an electric driving apparatus 7 is provided on the rack shaft via a gearbox 6. In other words, the electric driving apparatus 7 is incorporated into the electric power steering apparatus.

The electric driving apparatus 7 includes a motor 8, and an electronic control unit (ECU) 9 that is mounted on the motor 8 as a control unit. In other words, the electric driving apparatus 7 is an integrated electric driving apparatus in which the ECU 9 is integrated with the motor 8. The ECU 9 includes a control board and an inverter circuit. The ECU 9 is provided with a first connector 10, a second connector 11, and a power supply connector 12.

Information indicating the torque detected by the torque sensor 5 is transmitted from the torque sensor 5 to the ECU 9 via the first connector 10 in the form of an electric signal. Vehicle information, which is information such as the vehicle speed of the automobile, is transmitted from a sensor (a speed sensor or the like, for example) disposed in the vehicle to the ECU 9 via the second connector 11 in the form of an electric signal. A power supply (a battery, an alternator, or the like, for example) for supplying the ECU 9 with power is connected to the power supply connector 12. The ECU 9 calculates a required assist torque on the basis of the torque information from the torque sensor 5 and the vehicle information from the vehicle sensor, and supplies the motor 8 with a current corresponding to the assist torque via the inverter circuit.

The motor 8 generates torque from the power supplied thereto by the ECU 9. A belt and a ball screw (neither of which are shown in the drawing) are built into the gearbox 6. The torque generated by the motor 8, after being reduced via the gearbox 6, moves the rack shaft in the direction of an arrow A in FIG. 1. As a result, steering force generated by the driver is assisted by the torque from the motor 8.

When the rack shaft moves in the direction of the arrow A, the pair of tie rods 1 operate so as to rotate tires, and as a result, the vehicle turns. By assisting the steering force using the torque from the motor 8, the driver can turn the vehicle with a small amount of steering force.

Figure 2:
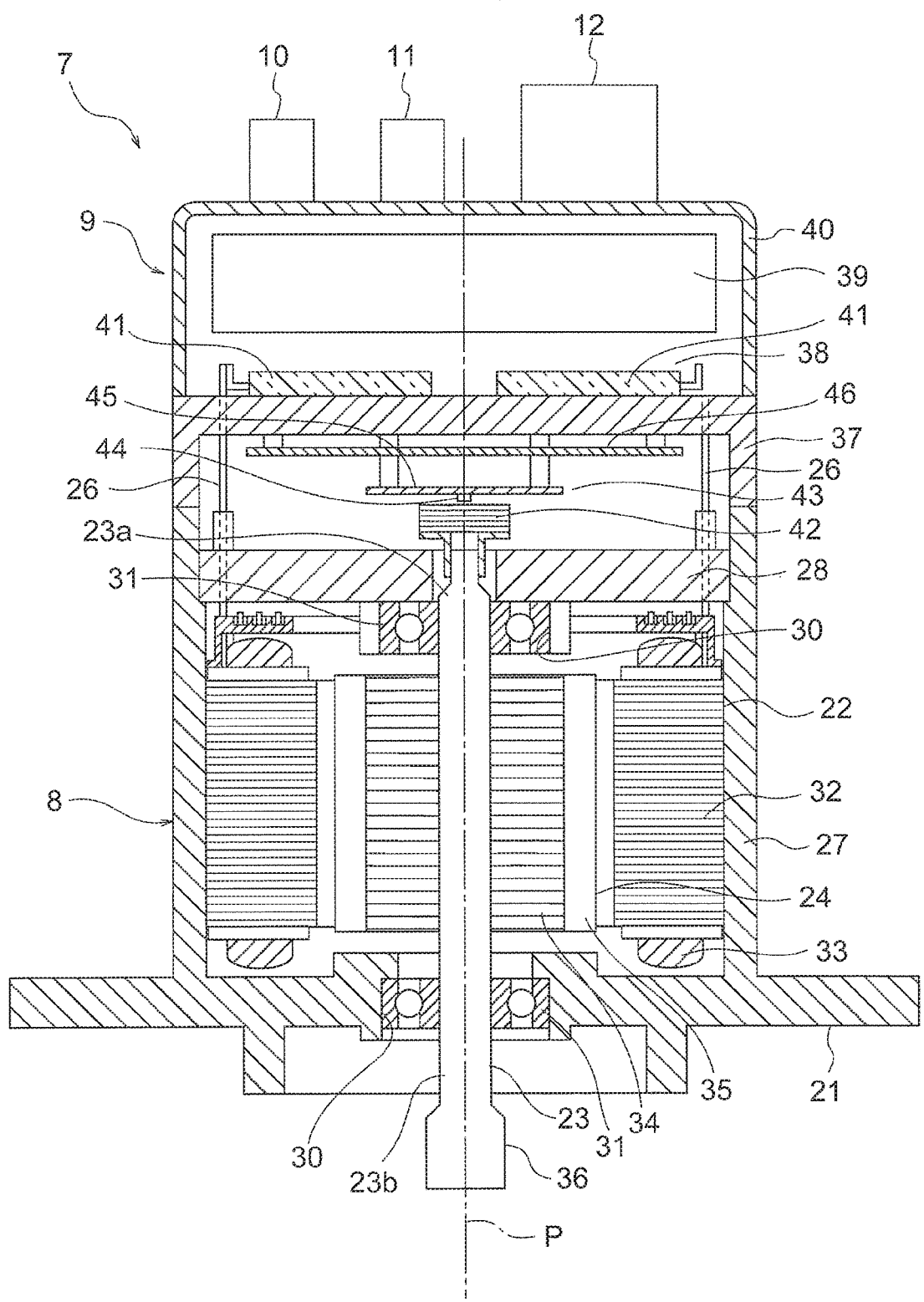
FIG. 2 is a sectional view showing an electric driving apparatus of FIG. 1.

FIG. 2 is a sectional view showing the electric driving apparatus 7 of FIG. 1. The motor 8 includes an aluminum housing 21, a tubular stator 22 serving as an armature that is fixed inside the housing 21, a shaft 23 serving as a rotary shaft that is supported within the housing 21 to be free to rotate, and a rotor 24 that is fixed to the shaft 23 so as to rotate integrally with the shaft 23 relative to the stator 22.

The housing 21 includes a tubular portion 27 that is closed at one end and open at the other end, and a wall portion 28 that is fixed to the tubular portion 27 so as to block the opening in the tubular portion 27. Through holes 30 through which the shaft 23 passes are provided respectively in the tubular portion 27 and the wall portion 28. Bearings 31 that support the shaft 23 to be free to rotate are fitted into the respective through holes 30.

The shaft 23 has a first end portion 23a and a second end portion 23b. The first end portion 23a is passed through the through hole 30 provided in the wall portion 28, and the second end portion 23b is passed through the through hole 30 provided in the tubular portion 27, and in this condition, the shaft 23 is supported by the respective bearings 31.

The stator 22 is fixed to an inner peripheral surface of the tubular portion 27 coaxially with an axis P of the shaft 23. Thus, the stator 22 is disposed on the periphery of the axis P of the shaft 23 so as to surround the shaft 23. Further, the stator 22 includes a tubular stator core 32, and an armature winding 33 provided on the stator core 32. The stator core 32 is formed by laminating a plurality of electromagnetic plates in a direction (referred to simply as the "axial direction" hereafter) extending along the axis P of the shaft 23.

The rotor 24 is disposed coaxially with the axis P of the shaft 23 such that a gap exists between the rotor 24 and an inner surface of the stator 22. Further, the rotor 24 includes a rotor core 34 having an identical axis to the axis P, and a plurality of permanent magnets 35 provided on the rotor core 34. The rotor 24 is fixed to the shaft 23 by press-fitting the rotor core 34 to the shaft 23. Accordingly, the rotor 24 rotates integrally with the shaft 23.

A pulley 36 is fixed to the second end portion 23b serving as an output end portion of the shaft 23. The belt of the gearbox 6 shown in FIG. 1 is wound around the pulley 36. Thus, the torque of the motor 8 is transmitted to the rack shaft via the gearbox 6.

The ECU 9 is mounted on an end portion, among the two axial direction end portions, of the tubular portion 27 on the side where the wall portion 28 is disposed. Further, the ECU 9 includes an aluminum heat sink 37 mounted on the tubular portion 27, an inverter circuit 38 provided on the heat sink 37 in order to drive the motor 8, a control board 39 that controls the inverter circuit 38, and a case 40 covering the inverter circuit 38 and the control board 39.

The heat sink 37 is fixed to the tubular portion 27 by screwing, shrink-fitting, or the like, for example. As a result, heat from the heat sink 37 can be transmitted to the housing 21. Further, the heat sink 37 is fixed to the tubular portion 27 so as to oppose the wall portion 28 in the axial direction of the shaft 23.

The inverter circuit 38 and the control board 39 are disposed on the opposite side of the heat sink 37 to the motor 8. In other words, the inverter circuit 38 and the control board 39 are disposed in positions further from the motor 8 than the heat sink 37 in the axial direction of the shaft 23.

The inverter circuit 38 includes a plurality of switching elements (MOST-FETs or the like, for example) 41. A configuration in which a bare chip is mounted on a direct bonded copper (DBC) substrate, a module configuration in which a bare chip is molded using resin, or the like, for example, may be employed as a configuration of the switching elements 41. The switching elements 41 are each mounted on the heat sink 37 via an adhesive, an insulating sheet, and so on. Although not shown in FIG. 2, the inverter circuit 38 includes, in addition to the switching elements 41, a smoothing capacitor, a noise removal coil, a power relay, a bus bar for electrically connecting these components, and so on. The bus bar is integrally molded with resin to form an intermediate member. The intermediate member including the bus bar is adjacent to the control board 39.

The switching elements 41 are connected to the armature winding 33 via a plurality of feeder wires 26 (six in this example) penetrating the wall portion 28 and the heat sink 37. Note that for simplicity, FIG. 2 shows only two of the six feeder wires 26. The feeder wires 26 are each electrically insulated from the wall portion 28 and the heat sink 37. Further, the feeder wires 26 are each disposed parallel to the axis P of the shaft 23. The current for driving the motor 8 is supplied to the armature winding 33 from the inverter circuit 38 through the feeder wires 26.

The control board 39 transmits control signals for controlling operations of the respective switching elements 41 individually to the inverter circuit 38 on the basis of the information received from the first connector 10 and the second connector 11. The inverter circuit 38 controls the current supplied from the inverter circuit 38 to the armature winding 33 by controlling the operations of the respective switching elements 41 individually on the basis of the control signals from the control board 39. When the current for driving the motor 8 flows through the switching elements 41, the switching elements 41 generate heat. The heat generated by the switching elements 41 is discharged into the outside air through the heat sink 37 and the housing 21. In this example, the control board 39 is disposed parallel to a plane that is orthogonal to the axis P of the shaft 23 of the motor 8.

The case 40 is fixed to the heat sink 37 so as to cover the inverter circuit 38 and the control board 39. The case 40 may be formed from resin, a metal such as aluminum, or a combination of resin and a metal such as aluminum.

A sensor magnet 42 constituted by a permanent magnet is provided on the first end portion 23a of the shaft 23, or in other words the ECU 9 side end portion of the shaft 23. A sensor device 43 that detects a magnetic field generated by the sensor magnet 42 is disposed between the sensor magnet 42 and the heat sink 37. The sensor device 43 is supported by the heat sink 37 via a plurality of pedestals. As a result, the sensor device 43 is disposed at a remove from the heat sink 37 toward the sensor magnet 42 side in the axial direction of the shaft 23. The sensor magnet 42 is magnetized to two poles having parallel anisotropy.

The sensor device 43 includes a rotation sensor 44 serving as a magnetic sensor that opposes the sensor magnet 42 in the axial direction of the shaft 23, and a sensor substrate 45 on which the rotation sensor 44 is mounted. The rotation sensor 44 is disposed on the axis P of the shaft 23. The sensor substrate 45 is connected to the control board 39 via a signal wire and a power wire, not shown.

When the shaft 23 and the rotor 24 rotate, the magnetic field generated by the sensor magnet 42 forms a rotating magnetic field that rotates in a circumferential direction about the axis P of the shaft 23 in accordance with the rotation of the shaft 23 and the rotor 24. The rotation sensor 44 detects the magnetic field generated by the sensor magnet 42 and the orientation of the magnetic field. By detecting the magnetic field generated by the sensor magnet 42 and the orientation thereof, the sensor device 43 detects a rotation angle of the rotor 24. Information indicating the rotation angle of the rotor 24, detected by the sensor device 43, is transmitted from the sensor substrate 45 to the control board 39. Upon reception of the information from the sensor device 43, the control board 39 transmits a control signal corresponding to the rotation angle of the rotor 24 to the inverter circuit 38. Accordingly, the ECU 9 supplies a drive current corresponding to the rotation angle detected by the sensor device 43 to the motor 8 through the plurality of feeder wires 26.

A shield plate 46 constituted by a flat plate formed from a magnetic material is disposed between the sensor device 43 (in other words, the rotation sensor 44 and the sensor substrate 45) and the inverter circuit 38. A strong magnetic material such as iron, for example, may be used as the magnetic material forming the shield plate 46. The shield plate 46 is a plate for shielding the rotation sensor 44 from magnetic fields generated by the feeder wires 26, the switching elements 41, and so on, for example. When the shield plate 46 is seen in the axial direction of the shaft 23, the sensor magnet 42 is disposed within the region of the shield plate 46, while the feeder wires 26 are disposed outside the region of the shield plate 46 on a radial direction outer side of the shield plate 46. In this example, the shield plate 46 is square. Further, in this example, the shield plate 46 is provided on the heat sink 37 via a plurality of pedestals. As a result, the shield plate 46 is disposed at a remove from the heat sink 37 toward the sensor device 43 side in the axial direction of the shaft 23. Furthermore, in this example, the shield plate 46 is disposed parallel to a plane that is orthogonal to the axis P of the shaft 23. By setting a maximum thickness of the shield plate 46 at approximately 1.0 mm, the shield plate 46 can block the magnetic fields from the feeder wires 26, the switching elements 41, and so on sufficiently.

Figure 3:
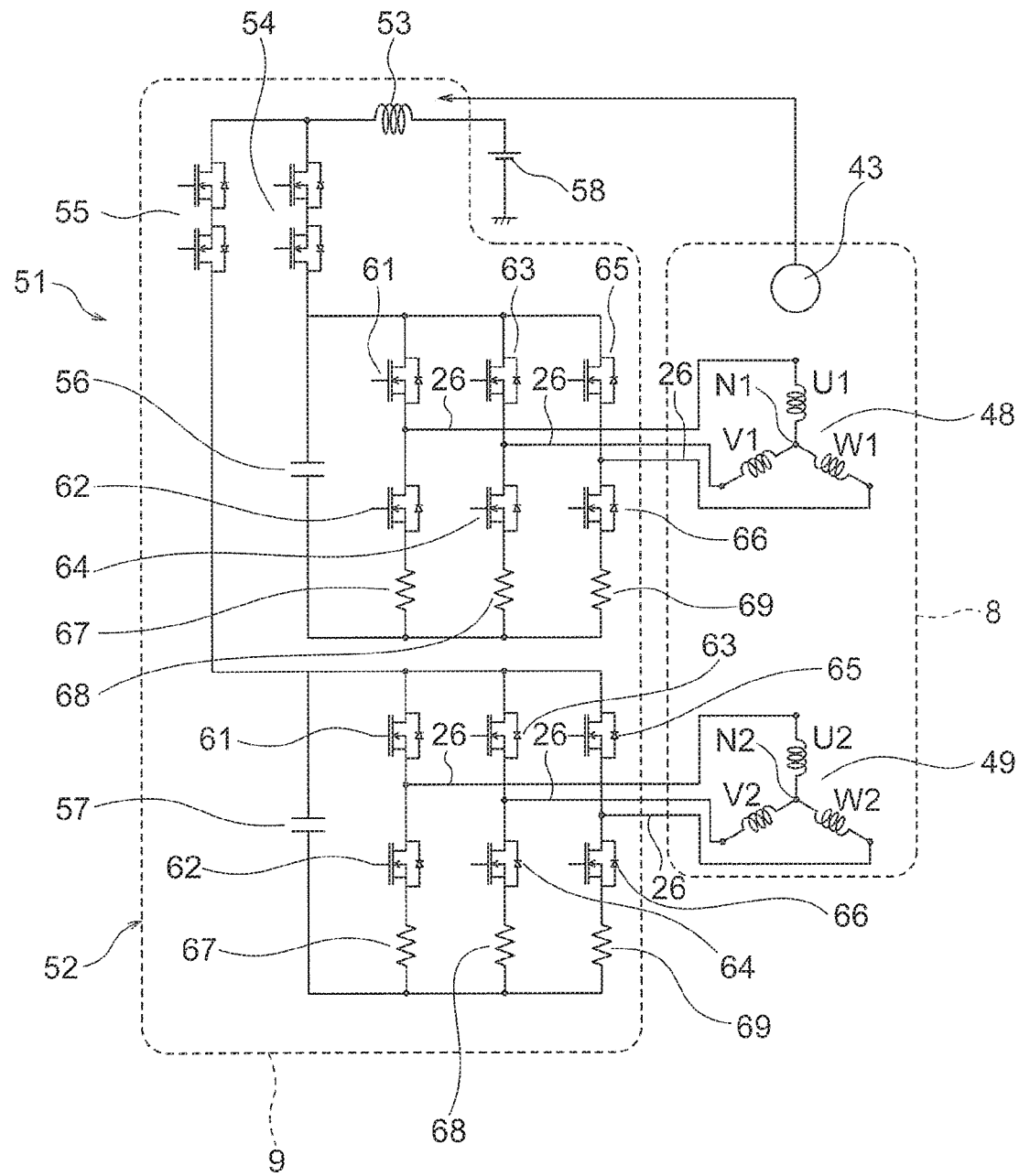
FIG. 3 is a diagram showing electric circuits of the electric driving apparatus of FIG. 2.

FIG. 3 is a diagram showing electric circuits of the electric driving apparatus 7 of FIG. 2. The armature winding 33 of the motor 8 has a first three-phase AC winding 48 including a U1 phase winding, a V1 phase winding, and a W1 phase winding, and a second three-phase AC winding 49 including a U2 phase winding, a V2 phase winding, and a W2 phase winding. In FIG. 3, the first and second three-phase AC windings 48, 49 are respectively Y-connected, but may be Δ-connected. Further, FIG. 3 shows only the armature winding 33 as a configuration of the motor 8, all other configurations having been omitted.

The inverter circuit 38 of the ECU 9 includes first and second inverters 51, 52, a noise removal coil 53, first and second power relays 54, 55, and first and second capacitors 56, 57. Currents of three phases, namely the U1 phase, the V1 phase, and the W1 phase, are supplied to the first three-phase AC winding 48 from the first inverter 51 through three of the feeder wires 26, while currents of three different phases, namely the U2 phase, the V2 phase, and the W2 phase, are supplied to the second three-phase AC winding 49 from the second inverter 52 through the other three feeder wires 26.

The noise removal coil 53 is electrically connected to the power supply connector 12 of FIG. 2. The first inverter 51 and the second inverter 52 are electrically connected to the noise removal coil 53 via the first power relay 54 and the second power relay 55, respectively. Power from a DC power supply (a battery or the like, for example) 58 is supplied to the first and second power relays 54, 55 via the power supply connector 12 and the noise removal coil 53.

The first and second power relays 54, 55 are each constituted by two MOST-FETs. The first and second power relays 54, 55 are opened when a fault occurs or the like to prevent excessive currents from being supplied to the first and second inverters 51, 52. Note that in FIG. 3, the first and second power relays 54, 55 are connected on the opposite side of the noise removal coil 53 to the power supply 58, but the first and second power relays 54, 55 may be connected on the same side of the noise removal coil 53 to the power supply 58.

The first and second inverters 51, 52 each include six MOST-FETs 61 to 66 that serve as a plurality of switching elements forming a bridge. Note that in FIG. 3, the switching elements 41 of FIG. 2 are shown as the MOST-FETs 61 to 66. In each of the first and second inverters 51, 52, first and second MOST-FETs 61, 62 connected to each other in series, third and fourth MOST-FETs 63, 64 connected to each other in series, and fifth and sixth MOST-FETs 65, 66 connected to each other in series are connected in parallel. Further, in each of the first and second inverters 51, 52, a first shunt resistor 67 is connected to a ground (GND) side of the second MOST-FET 62, a second shunt resistor 68 is connected to the GND side of the fourth MOST-FET 64, and a third shunt resistor 69 is connected to the GND side of the sixth MOST-FET 66. The first to third shunt resistors 67 to 69 are used to detect current values. Note that in this example, three shunt resistors 67 to 69 are provided in each of the first and second inverters 51, 52, but since current detection is possible likewise when the number of shunt resistors provided in each of the first and second inverters 51, 52 is set at two or one, the number of shunt resistors provided in each of the first and second inverters 51, 52 may be set at two or one.

As shown in FIG. 3, the currents supplied from the first inverter 51 to the motor 8 are supplied respectively to the U1 phase of the motor 8 through the feeder wire 26 of the U1 phase between the first and second MOST-FETs 61, 62 of the first inverter 51, to the V1 phase of the motor 8 through the feeder wire 26 of the V1 phase between the third and fourth MOST-FETs 63, 64 of the first inverter 51, and to the W1 phase of the motor 8 through the feeder wire 26 of the W1 phase between the fifth and sixth MOST-FETs 65, 66 of the first inverter 51.

As shown in FIG. 3, the currents supplied from the second inverter 52 to the motor 8 are supplied respectively to the U2 phase of the motor 8 through the feeder wire 26 of the U2 phase between the first and second MOST-FETs 61, 62 of the second inverter 52, to the V2 phase of the motor 8 through the feeder wire 26 of the V2 phase between the third and fourth MOST-FETs 63, 64 of the second inverter 52, and to the W2 phase of the motor 8 through the feeder wire 26 of the W2 phase between the fifth and sixth MOST-FETs 65, 66 of the second inverter 52.

In the first inverter 51, the first capacitor 56 is connected in parallel to the first MOST-FET 61, the second MOST-FET 62, and the first shunt resistor 67. Further, in the second inverter 52, the second capacitor 57 is connected in parallel to the first MOST-FET 61, the second MOST-FET 62, and the first shunt resistor 67. The first and second capacitors 56, 57 are smoothing capacitors. Note that in FIG. 3, the first and second capacitors 56, 57 are each provided singly, but instead, a plurality of first capacitors 56 may be connected in parallel to the first inverter 51 and a plurality of second capacitors 57 may be connected in parallel to the second inverter 52.

Further, although motor relays for electrically disconnecting the motor 8 from the first and second inverters 51, 52 respectively when a fault occurs are not shown in FIG. 3, the motor relays may be provided at neutral points N1, N2 of the first and second armature windings 48, 49 or between the motor 8 and the first and second inverters 51, 52.

The ECU 9 supplies three-phase currents to each of the first and second three-phase AC windings 48, 49 through the six feeder wires 26 by transmitting a signal corresponding to the rotation angle detected by the sensor device 43 from the control board 39, shown in FIG. 2, to each of the first and second inverters 51, 52 as a control signal in order to switch the first to sixth MOST-FETs 61 to 66 in each of the first and second inverters 51, 52.

In this example, a current phase difference of 120° exists between each of the feeder wires 26 of the U1 phase, the V1 phase, and the W1 phase, and a current phase difference of 120° exists between each of the feeder wires 26 of the U2 phase, the V2 phase, and the W2 phase. Further, in this example, no current phase difference exists between the feeder wires 26 of the U1 phase and the U2 phase, no current phase difference exists between the feeder wires 26 of the V1 phase and the V2 phase, and no current phase difference exists between the feeder wires 26 of the W1 phase and the W2 phase. In other words, in this example, the respective current phase differences between the feeder wires 26 are set at 0° between the U1 phase and the U2 phase, between the V1 phase and the V2 phase, and between the W1 phase and the W2 phase.

Figure 4:
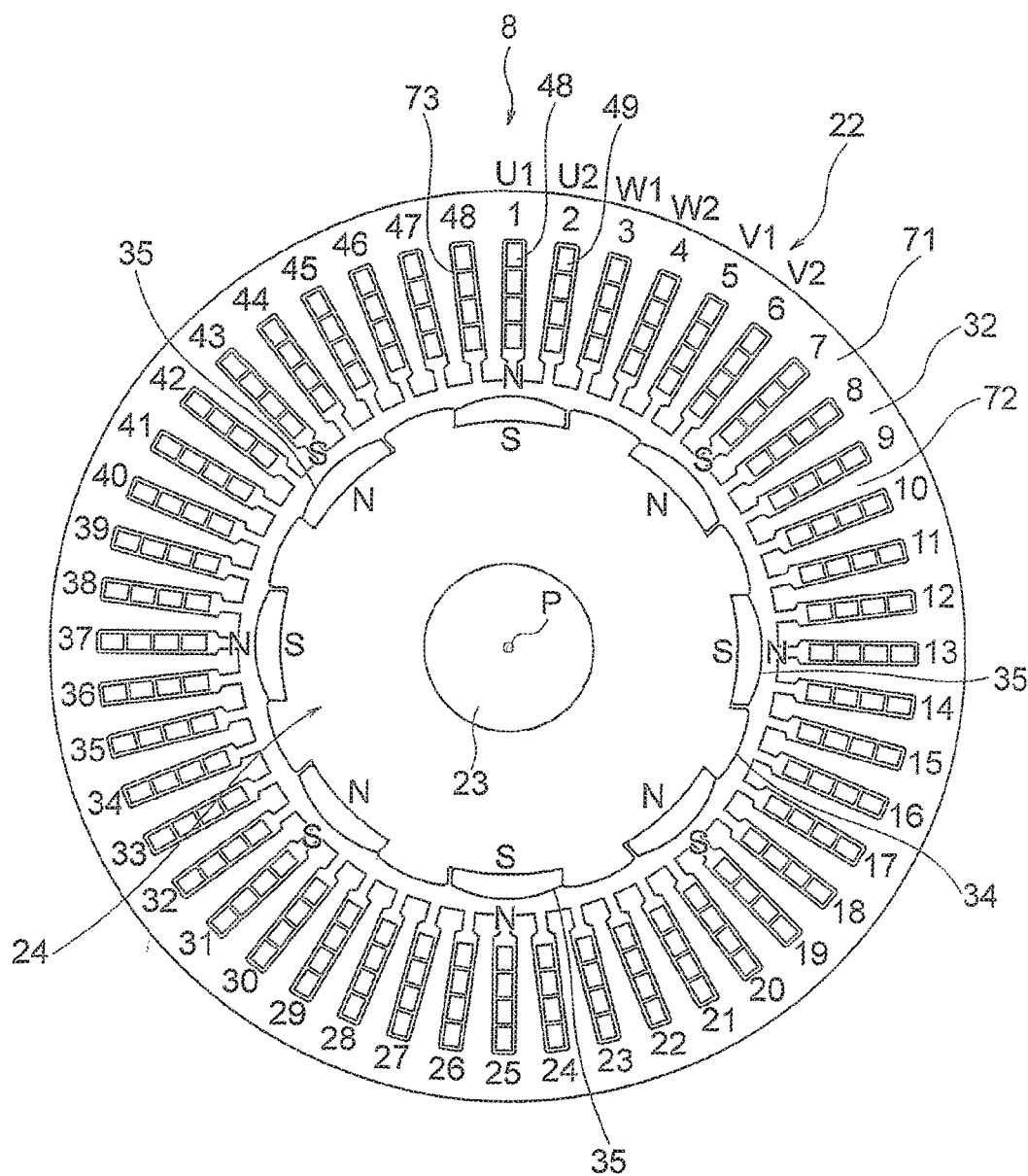
FIG. 4 is a sectional view showing a motor of FIG. 2.

FIG. 4 is a sectional view showing the motor 8 of FIG. 2. The stator core 32 includes a tubular core back 71, and a plurality of teeth 72 projecting inwardly in a circumferential direction from the core back 71. The teeth 72 are disposed at intervals in the circumferential direction of the stator core 32. Slots 73 are formed between adjacent teeth 72. The first and second three-phase AC windings 48, 49 are housed in the slots 73. Although not shown in the drawing, insulating paper or the like is inserted between the stator core 32 and the first and second three-phase AC windings 48, 49 to secure electrical insulation.

In this example, the number of teeth 72 is 48. Accordingly, the number of slots 73 is also 48. Four conductor wires of the first or second three-phase AC winding 48, 49 are housed in each slot 73.

As shown in FIG. 4, the first three-phase AC winding 48 including respective windings of the U1 phase, the V1 phase, and the W1 phase and the second three-phase AC winding 49 including respective windings of the U2 phase, the V2 phase, and the W2 phase are disposed in order of U1, U2, W1, W2, V1, V2 from the first slot 73, in order of U1, U2, W1, W2, V1, V2 from the seventh slot 73, and similarly up to the forty-eighth slot 73.

Note, however, that the first and second three-phase AC windings 48, 49 are disposed such that U1 in the first slot 73 and U1 in the seventh slot 73 have mutually opposite current orientations. In other words, the first and second three-phase AC windings 48, 49 are configured as distributed windings wound from the first slot 73 to the seventh slot 73 so as to straddle a total of six teeth 72. This corresponds to an electrical angle of 180 degrees and a short pitch winding factor of 1, and therefore magnetic flux generated by the permanent magnets 35 can be used effectively, with the result that a small, high-torque motor 8 can be obtained and the number of permanent magnets 35 can be reduced. As a result, a reduction in cost can be achieved in comparison with a motor having a small winding factor.

Figure 5:
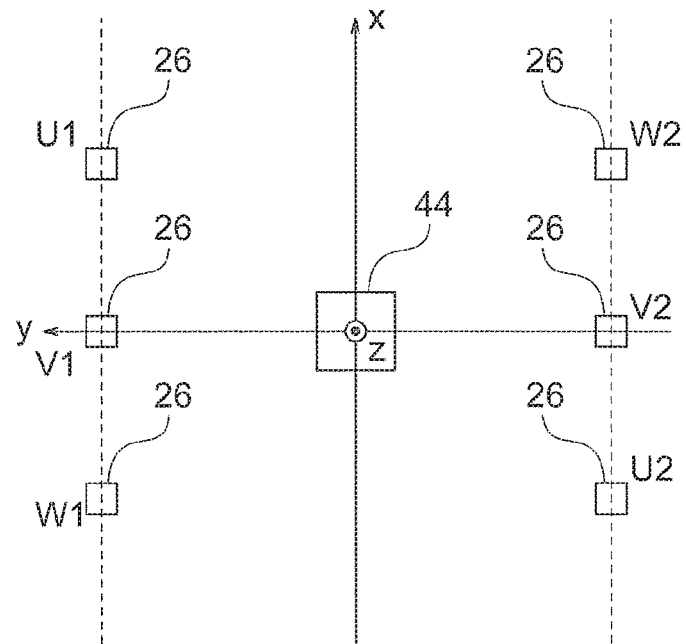
FIG. 5 is a configurational pattern diagram showing a positional relationship between a rotation sensor and respective feeder wires when seen in an axial direction of a shaft of FIG. 2.

The effect of the magnetic fields generated by the respective feeder wires 26 on the rotation sensor 44 will now be considered. FIG. 5 is a configurational pattern diagram showing a positional relationship between the rotation sensor 44 and the respective feeder wires 26 as seen in the axial direction of the shaft 23 of FIG. 2. In FIG. 5, the axis of the shaft 23 is set as a z axis, and a direction traveling from the first end portion 23a to the second end portion 23b of the shaft 23 is set as a single direction. Further, in FIG. 5, the position of the rotation sensor 44 on the z axis is set as the origin, while a plane including an x axis that passes through the origin and is orthogonal to the z axis and a y axis that passes through the origin and is orthogonal to both the x axis and the z axis is set as an x-y plane.

The sensor magnet 42 is formed such that the rotating magnetic field corresponding to the rotation of the shaft 23 is formed within the x-y plane. The feeder wires 26, meanwhile, are disposed apart from each other on the periphery of the rotation sensor 44 when seen in the axial direction of the shaft 23. Further, the respective feeder wires 26 of the U1 phase, the V1 phase, the W1 phase, the U2 phase, the V2 phase, and the W2 phase penetrate the x-y plane on the periphery of the rotation sensor 44. In accordance with Ampere's law, therefore, the currents flowing through the respective feeder wires 26 also form magnetic fields within the x-y plane. The magnetic fields formed in the x-y plane by the currents flowing through the respective feeder wires 26 act on the rotation sensor 44 as noise magnetic fields, and may as a result cause the rotation sensor 44 to produce a detection error.

Figure 6:
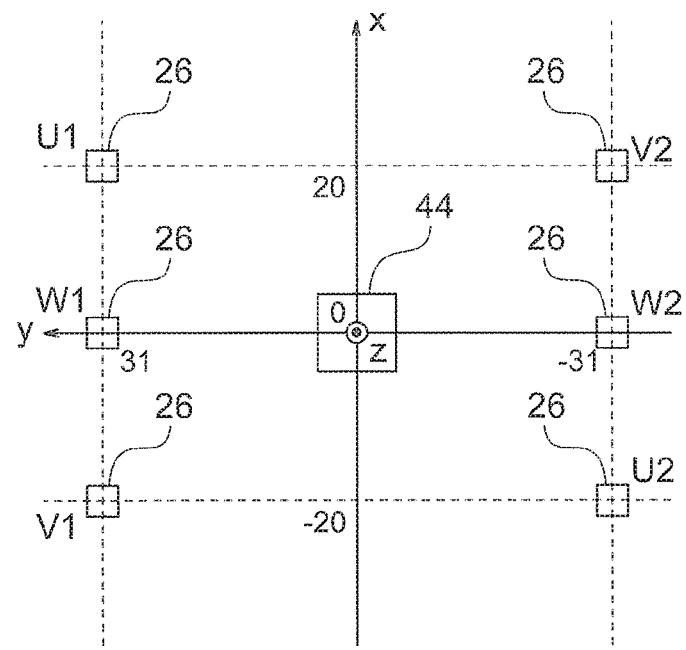
FIG. 6 is a configurational pattern diagram showing the positional relationship between the rotation sensor and the respective feeder wires in a case where the positions of the feeder wires in FIG. 5 are in point symmetry with a z axis.
Figure 7:
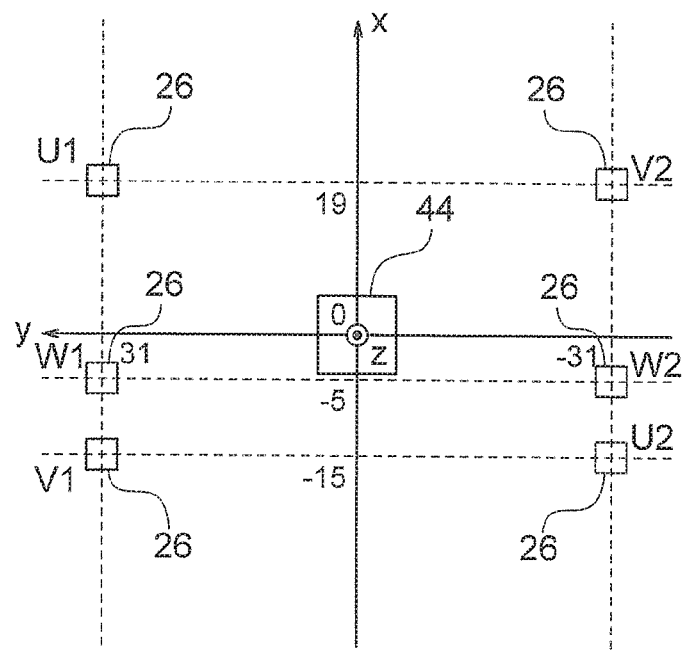
FIG. 7 is a configurational pattern diagram showing the positional relationship between the rotation sensor and the respective feeder wires in a case where the positions of the feeder wires in FIG. 5 are out of point symmetry with the z axis.

FIG. 6 is a configurational pattern diagram showing a positional relationship between the rotation sensor 44 and the respective feeder wires 26 when the positions of the feeder wires 26 in FIG. 5 are in point symmetry with the z axis. Further, FIG. 7 is a configurational pattern diagram showing a positional relationship between the rotation sensor 44 and the respective feeder wires 26 in a case where the positions of the feeder wires 26 in FIG. 5 are out of point symmetry with the z axis. In FIGS. 6 and 7, the position of the rotation sensor 44 is set as the origin, and the positions of the respective feeder wires 26 of the U1 phase, the V1 phase, the W1 phase, the U2 phase, the V2 phase, and the W2 phase are defined by an x coordinate and a y coordinate. Further, the unit of the numerals shown in FIGS. 6 and 7 is mm. Note that the length of each of the feeder wires 26 in the z axis direction is set at 38 mm, the z coordinate of one end portion of each feeder wire 26 is set at −11 mm, and the z coordinate of the other end portion of each feeder wire 26 is set at 27 mm.

In other words, in FIG. 6, the positions (x coordinate, y coordinate) of the respective feeder wires 26 are (20, 31) in the U1 phase, (−20, 31) in the V1 phase, (0, 31) in the W1 phase, (−21, −31) in the U2 phase, (20, −31) in the V2 phase, and (0, −31) in the W2 phase. In FIG. 6, therefore, the positions of the feeder wires 26 of respective groups, wherein the U1 phase and the U2 phase form a group, the V1 phase and the V2 phase form a group, and the W1 phase and the W2 phase form a group, are in point symmetry to the z axis (in other words, the axis P of the shaft 23) in each group when seen in the axial direction of the shaft 23.

In FIG. 7, on the other hand, the positions (x coordinate, y coordinate) of the respective feeder wires 26 are (19, 31) in the U1 phase, (−15, 31) in the V1 phase, (−5, 31) in the W1 phase, (−15, −31) in the U2 phase, (19, −31) in the V2 phase, and (−5, −31) in the W2 phase. In FIG. 7, therefore, the positions of all of the groups of feeder wires 26, i.e. the group constituted by the U1 phase and the U2 phase, the group constituted by the V1 phase and the V2 phase, and the group constituted by the W1 phase and the W2 phase, are out of point symmetry with the z axis when seen in the axial direction of the shaft 23.

Here, intensity values of the noise magnetic field in the position of the rotation sensor 44 in the case of FIG. 6, i.e. when the positions of the feeder wires 26 are in point symmetry with the z axis, and the case of FIG. 7, i.e. when the positions of the feeder wires 26 are out of point symmetry with the z axis, were measured and compared.

Figure 8:
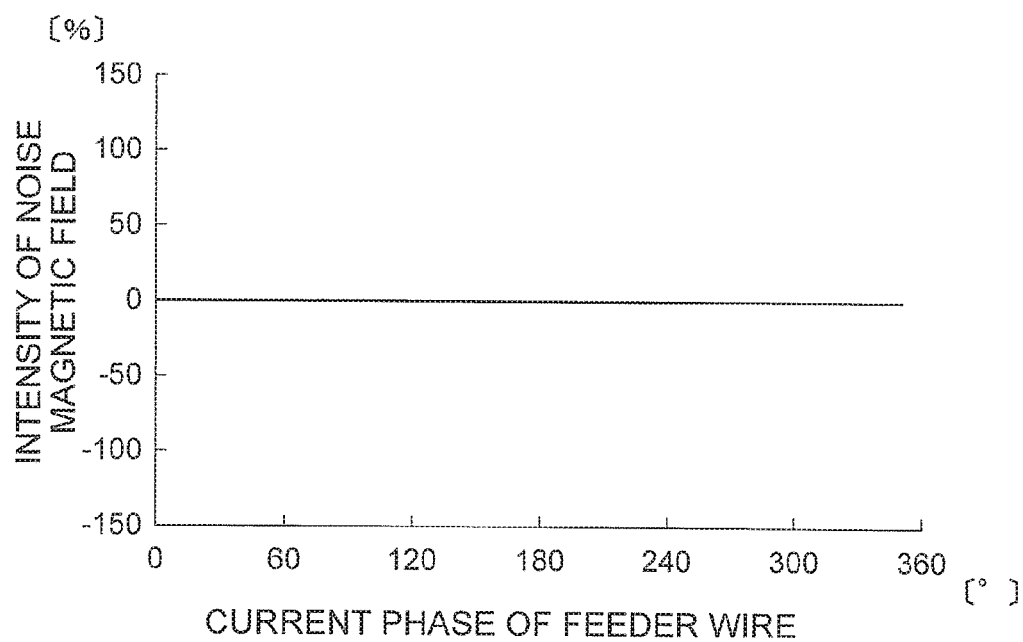
FIG. 8 is a graph showing a relationship between a current phase and an intensity of a noise magnetic field in the position of the rotation sensor when the rotation sensor and the respective feeder wires have the positional relationship shown in FIG. 6.
Figure 9:
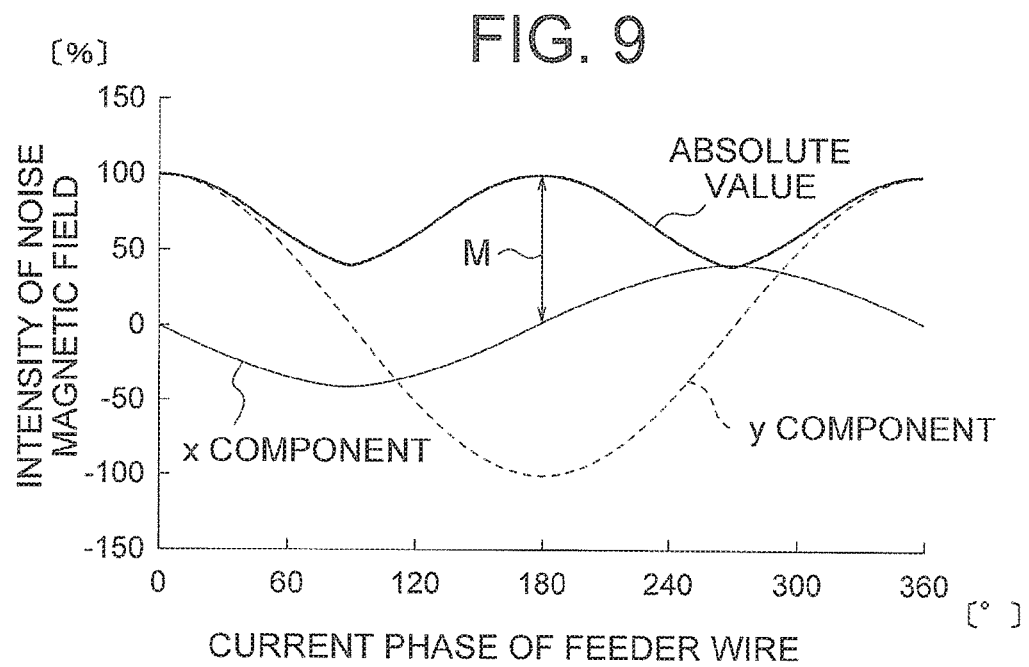
FIG. 9 is a graph showing the relationship between the current phase and the intensity of the noise magnetic field in the position of the rotation sensor when the rotation sensor and the respective feeder wires have the positional relationship shown in FIG. 7.

FIG. 8 is a graph showing a relationship between the current phase and the intensity of the noise magnetic field in the position of the rotation sensor 44 when the rotation sensor 44 and the respective feeder wires 26 have the positional relationship shown in FIG. 6. Further, FIG. 9 is a graph showing the relationship between the current phase and the intensity of the noise magnetic field in the position of the rotation sensor 44 when the rotation sensor 44 and the respective feeder wires 26 have the positional relationship shown in FIG. 7. An x component, a y component, and an absolute value of the noise magnetic field in the position of the rotation sensor 44, or in other words at the origin, were calculated while varying the current phases of the respective feeder wires 26, and in FIGS. 8 and 9, the absolute value of the noise magnetic field is shown as the intensity of the noise magnetic field. Further, FIGS. 8 and 9 show the calculated intensity of the noise magnetic field in a hypothetical case where only the feeder wires 26 are disposed on the periphery of the rotation sensor 44. Moreover, in FIGS. 8 and 9, a maximum value M of the absolute value of the noise magnetic field in FIG. 9 is set at 100%.

Comparing FIGS. 8 and 9, in the case of FIG. 6, where the positions of the respective feeder wires 26 are in point symmetry with the position of the rotation sensor 44, the noise magnetic field in the position of the rotation sensor 44 is canceled out so as to fall to zero, as shown in FIG. 8. In the case of FIG. 7, on the other hand, where the positions of the respective feeder wires 26 are out of point symmetry with the rotation sensor 44, the noise magnetic field in the position of the rotation sensor 44 is not canceled out, as is evident from FIG. 9, and as a result, the noise magnetic fields from the respective feeder wires 26 may cause the rotation sensor 44 to produce a detection error.

Next, the shielding effect exerted by the shield plate 46 on the noise magnetic field in the position of the rotation sensor 44 will be described. Here, when the rotation sensor 44 and the respective feeder wires 26 have the positional relationship shown in FIG. 7, the noise magnetic field is not canceled out, as shown in FIG. 9, and therefore the shielding effect obtained with the shield plate 46 in a case where the rotation sensor 44 and the respective feeder wires 26 have the positional relationship shown in FIG. 7 will be described.

To confirm the shielding effect exerted on the noise magnetic field by the shield plate 46, the intensity of the noise magnetic field at the origin was calculated while varying the position of the shield plate 46 within a z coordinate range of 5 mm to 15 mm in a case where the rotation sensor 44 and the respective feeder wires 26 have the positional relationship shown in FIG. 7. Further, a flat plate 44 mm long, 44 mm wide, and 0.5 mm thick was used as the shield plate 46, and the shield plate 46 was disposed in a position where the z axis passed through the center of the flat plate. Furthermore, the intensity of the noise magnetic field was calculated with the shield plate 46 set in four positions (in other words, four calculation points) within the z coordinate range of 5 mm to 15 mm. Note that the z coordinate value of the shield plate 46 indicates a distance between the rotation sensor 44 and the shield plate 46.

Figure 10:
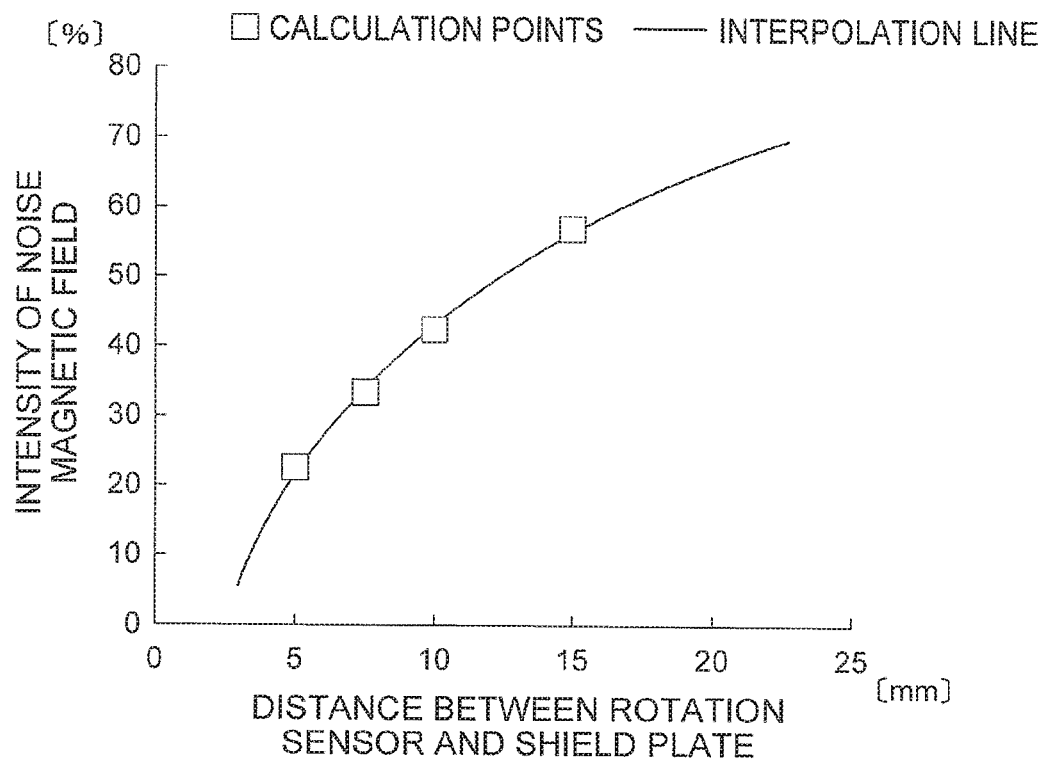
FIG. 10 is a graph showing a relationship between a z axis direction position of a shield plate and the intensity of the noise magnetic field at an origin when the rotation sensor and the respective feeder wires have the positional relationship shown in FIG. 7.

FIG. 10 is a graph showing a relationship between the z axis direction position of the shield plate 46 and the intensity of the noise magnetic field at the origin when the rotation sensor 44 and the respective feeder wires 26 have the positional relationship shown in FIG. 7. Note that in FIG. 10, maximum values of the absolute value of the noise magnetic field at the origin in a case where the shield plate 46 is disposed successively in four locations within the z coordinate range of 5 mm to 15 mm are indicated as the four calculation points. FIG. 10 also shows an interpolation line that interpolates the four calculation points by connecting the four calculation points smoothly. Furthermore, in FIG. 10, the maximum value M of the absolute value of the noise magnetic field in FIG. 9 is set at 100%.

It can be seen from FIG. 10 that when the shield plate 46 is disposed in a position on the z axis having a positive value, the intensity of the noise magnetic field in the position of the rotation sensor 44 is lower than 100% (in other words, a case in which the shield plate 46 is not provided). It can also be seen that the intensity of the noise magnetic field in the position of the rotation sensor 44 steadily decreases as the position of the shield plate 46 approaches the rotation sensor 44. It is therefore clear that by disposing the shield plate 46 in a position further from the sensor magnet 42 than the rotation sensor 44 in the axial direction of the shaft 23, the noise magnetic field in the position of the rotation sensor 44 can be reduced, and that the noise magnetic field reduction effect obtained with the shield plate 46 steadily increases as the position of the shield plate 46 approaches the rotation sensor 44.

Next, the effect of the shield plate 46 on the magnetic field generated by the sensor magnet 42 will be described. Here, similarly to the case described above, the effect of the shield plate 46 on the magnetic field generated by the sensor magnet 42 in a case where the rotation sensor 44 and the respective feeder wires 26 have the positional relationship shown in FIG. 7 will be described.

To confirm the effect of the shield plate 46 on the magnetic field generated by the sensor magnet 42, the intensity of the magnetic field generated by the sensor magnet 42 at the origin was calculated while varying the position of the shield plate 46 within a z coordinate range of 5 mm to 15 mm in a case where the rotation sensor 44 and the respective feeder wires 26 have the positional relationship shown in FIG. 7. Further, as regards the shape and size of the sensor magnet 42, the sensor magnet 42 was formed in a columnar shape having a diameter $\phi$ of 15 mm and a thickness t of 5 mm. Furthermore, the sensor magnet 42 was disposed with an upper face of the column opposing the rotation sensor 44, and positioned such that the z coordinate of the upper face was −2 mm and the z coordinate of a lower face was −7 mm. Moreover, similarly to the case described above, a flat plate 44 mm long, 44 mm wide, and 0.5 mm thick was used as the shield plate 46, and the shield plate 46 was disposed in a position where the z axis passed through the center of the flat plate. Furthermore, the intensity of the noise magnetic field was calculated with the shield plate 46 set in four positions (in other words, four calculation points) within the z coordinate range of 5 mm to 15 mm.

Figure 11:
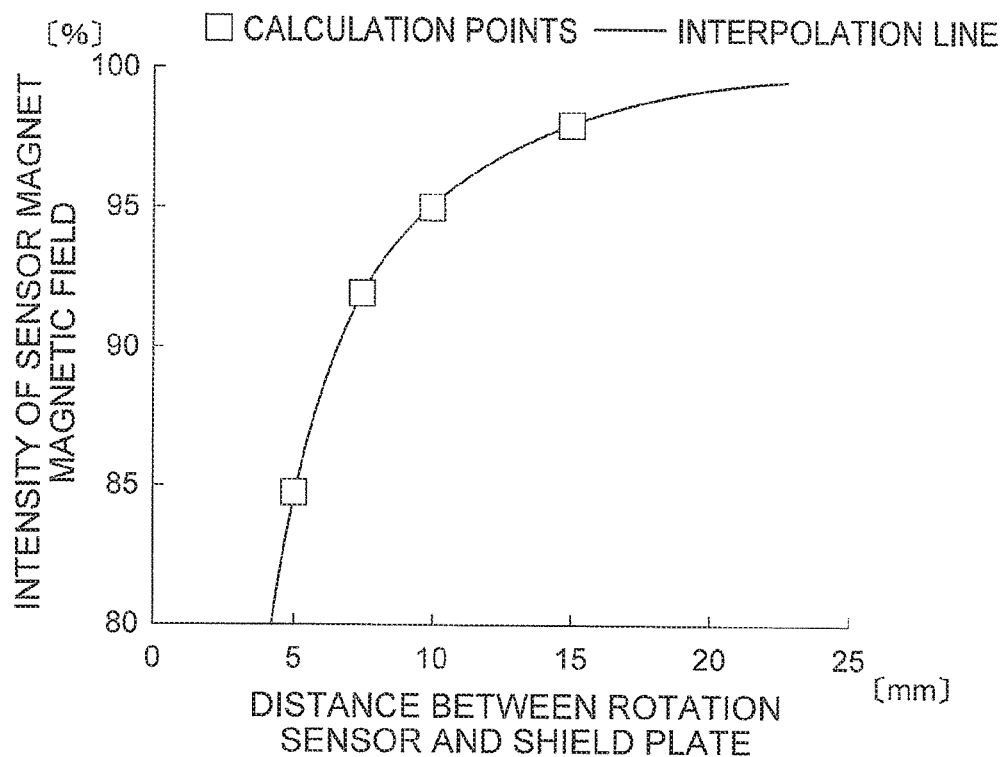
FIG. 11 is a graph showing the relationship between the z axis direction position of the shield plate and an intensity of a magnetic field generated by a sensor magnet at the origin when the rotation sensor and the respective feeder wires have the positional relationship shown in FIG. 7.

FIG. 11 is a graph showing the relationship between the z axis direction position of the shield plate 46 and the intensity of the magnetic field generated by the sensor magnet 42 at the origin when the rotation sensor 44 and the respective feeder wires 26 have the positional relationship shown in FIG. 7. Note that FIG. 11 also shows an interpolation line that interpolates the four calculation points by connecting the four calculation points smoothly. Further, in FIG. 11, the intensity of the magnetic field generated by the sensor magnet at the origin when the shield plate 46 is not provided is set at 100%.

It can be seen from FIG. 11 that the intensity of the magnetic field generated by the sensor magnet 42 steadily approaches 100% as the distance between the shield plate 46 and the rotation sensor 44 increases. In particular, it can be seen that when the distance between the shield plate 46 and the rotation sensor 44 equals or exceeds 7 mm, a magnetic field having an intensity that equals or exceeds 90% is secured by the sensor magnet 42 at the origin. It can also be seen that in a range where the distance between the shield plate 46 and the rotation sensor 44 equals or exceeds 7 mm, the intensity of the magnetic field generated by the sensor magnet 42 at the origin starts to vary more gently. It is therefore clear that in a range where the distance between the shield plate 46 and the rotation sensor 44 equals or exceeds 7 mm, the intensity of the magnetic field generated by the sensor magnet 42 in the position of the rotation sensor 44 varies by a small amount, even allowing for a deviation of approximately ±0.5 mm in the position of the sensor magnet 42 or the position of the rotation sensor 44 due to a mounting error or the like, for example.

Hence, in the electric driving apparatus 7, the shield plate 46 is disposed between the rotation sensor 44 and the inverter circuit 38, and therefore noise magnetic fields exerted on the rotation sensor 44 from the feeder wires 26, the inverter circuit 38, and so on, for example, can be blocked by the shield plate 46. Further, the shield plate 46 is positioned further from the sensor magnet 42 than the rotation sensor 44, and therefore the intensity of the magnetic field generated by the sensor magnet 42 is unlikely to decrease in the position of the rotation sensor 44. As a result, detection errors by the rotation sensor 44 can be reduced, whereby a reduction in the performance of the electric driving apparatus 7 can be suppressed. Moreover, detection errors by the rotation sensor 44 can be reduced using the shield plate 46, and therefore the disposal freedom of the feeder wires 26 can be improved, enabling an improvement in component disposal freedom. Furthermore, there is no need to increase the thickness of the sensor magnet 42 in the axial direction of the shaft 23 in order to increase the intensity of the magnetic flux generated by the sensor magnet 42, and therefore increases in the size and cost of the electric driving apparatus 7 can be prevented. Further, distortion of the magnetic field generated by the sensor magnet 42 when the shield plate 46 is disposed can be reduced, and therefore a torque ripple generated when the shield plate 46 is disposed can be prevented from increasing. As a result, the driver can experience an improved steering feeling.

Moreover, when seen along the axis P of the shaft 23, the sensor magnet 42 is disposed in the region of the shield plate 46 and the plurality of feeder wires 26 are disposed outside the region of the shield plate 46. Therefore, the noise magnetic fields from the respective feeder wires 26 can be blocked effectively by the shield plate 46 while preventing an increase in the size of the electric driving apparatus 7.

Furthermore, the distance between the shield plate 46 and the rotation sensor 44 equals or exceeds 7 mm, and therefore the intensity of the noise magnetic fields from the respective feeder wires 26 can be reduced effectively by the shield plate 46 in the position of the rotation sensor 44 while suppressing a reduction caused by the shield plate 46 in the intensity of the magnetic field generated by the sensor magnet 42. Thus, detection errors by the rotation sensor 44 can be reduced even further, and as a result, a reduction in the performance of the electric driving apparatus 7 can be further suppressed.

Moreover, the positions of all of the groups of feeder wires 26, i.e. the group constituted by the U1 phase and the U2 phase, the group constituted by the V1 phase and the V2 phase, and the group constituted by the W1 phase and the W2 phase, are out of point symmetry with the axis P of the shaft 23 when seen along the axis P of the shaft 23, and therefore the intensity of the noise magnetic field in the position of the rotation sensor 44 can be reduced by the shield plate 46 even in a condition where the magnetic fields from the respective feeder wires 26 would not cancel each other out in the position of the rotation sensor 44, and the intensity of the noise magnetic fields would increase, if the shield plate 46 were not provided.

Second Embodiment

In the first embodiment, the respective current phase differences between the feeder wires 26 are set at 0° between the U1 phase and the U2 phase, between the V1 phase and the V2 phase, and between the W1 phase and the W2 phase, but instead, the respective current phase differences between the feeder wires 26 may be set at 30° between the U1 phase and the U2 phase, between the V1 phase and the V2 phase, and between the W1 phase and the W2 phase. In other words, in this embodiment, the current phases of the respective feeder wires 26 are set to differ by 30° between the U1 phase and the U2 phase, between the V1 phase and the V2 phase, and between the W1 phase and the W2 phase. All other configurations are identical to the first embodiment.

Figure 12:
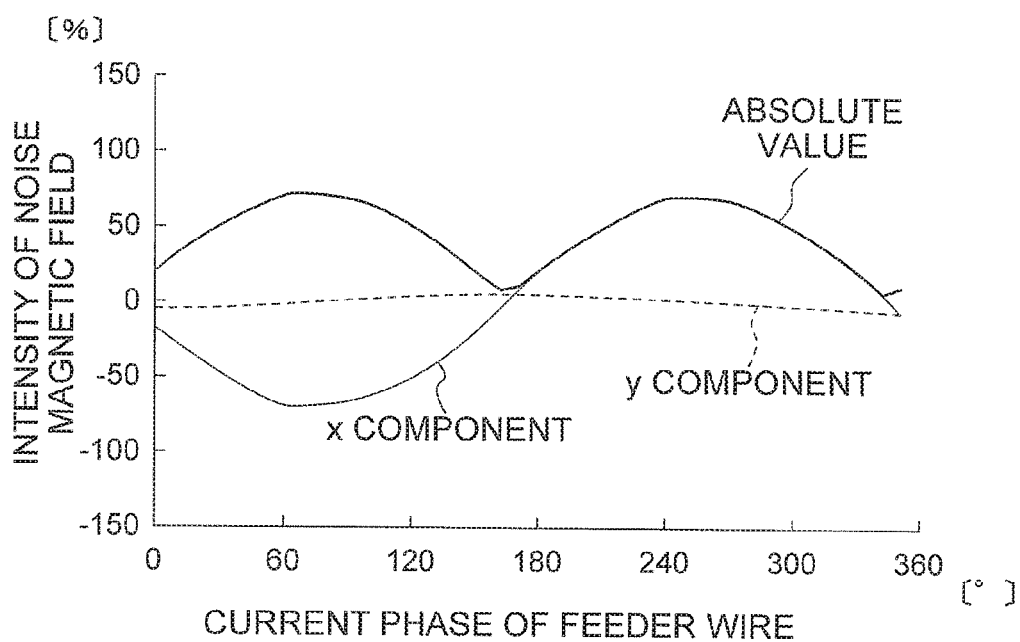
FIG. 12 is a graph showing the relationship between the current phase and the intensity of the noise magnetic field at the origin when the rotation sensor and the respective feeder wires have the positional relationship shown in FIG. 7, according to a second embodiment of this invention.

Next, the effect exerted on the rotation sensor 44 by the magnetic fields from the respective feeder wires 26 in this embodiment when the rotation sensor 44 and the respective feeder wires 26 have the positional relationship shown in FIG. 7 will be described. FIG. 12 is a graph showing the relationship between the current phase and the intensity of the noise magnetic field at the origin when the rotation sensor 44 and the respective feeder wires 26 have the positional relationship shown in FIG. 7, according to the second embodiment of this invention. FIG. 12, similarly to FIGS. 8 and 9, shows the absolute value of the noise magnetic field at the origin as the intensity of the noise magnetic field. Further, FIG. 12 shows the calculated intensity of the noise magnetic field in a hypothetical case where only the feeder wires 26 are disposed on the periphery of the rotation sensor 44. Moreover, FIG. 12 likewise shows the intensity of the noise magnetic field when the maximum value of the absolute value of the noise magnetic field in FIG. 9 is set at 100%.

Similarly to FIG. 9, it can be seen from FIG. 12 that when the respective current phases of the feeder wires 26 deviate by 30° between the U1 phase and the U2 phase, between the V1 phase and the V2 phase, and between the W1 phase and the W2 phase, the noise magnetic field in the position of the rotation sensor 44 is not canceled out, and therefore the noise magnetic fields from the respective feeder wires 26 cause the rotation sensor 44 to produce a detection error. Further, in FIG. 12, the maximum value of the absolute value of the noise magnetic field in the position of the rotation sensor 44 is approximately 69%, which is smaller than that of the case shown in FIG. 9. Note that when the respective current phases of the feeder wires 26 are shifted by 30° between the U1 phase and the U2 phase, between the V1 phase and the V2 phase, and between the W1 phase and the W2 phase, an electrical angle sixth order component of the torque ripple is canceled out, leading to an improvement in the performance of the motor 8.

Next, the shielding effect exerted by the shield plate 46 on the noise magnetic field in the position of the rotation sensor 44 according to this embodiment will be described. Similarly to the first embodiment, to confirm the shielding effect exerted on the noise magnetic field by the shield plate 46, the intensity of the noise magnetic field at the origin was calculated while varying the position of the shield plate 46 within a z coordinate range of 5 mm to 15 mm in a case where the rotation sensor 44 and the respective feeder wires 26 have the positional relationship shown in FIG. 7. Further, a flat plate 44 mm long, 44 mm wide, and 0.5 mm thick was used as the shield plate 46, and the shield plate 46 was disposed in a position where the z axis passed through the center of the flat plate. Furthermore, the intensity of the noise magnetic field was calculated with the shield plate 46 set in four positions (four calculation points) within the z coordinate range of 5 mm to 15 mm.

Figure 13:
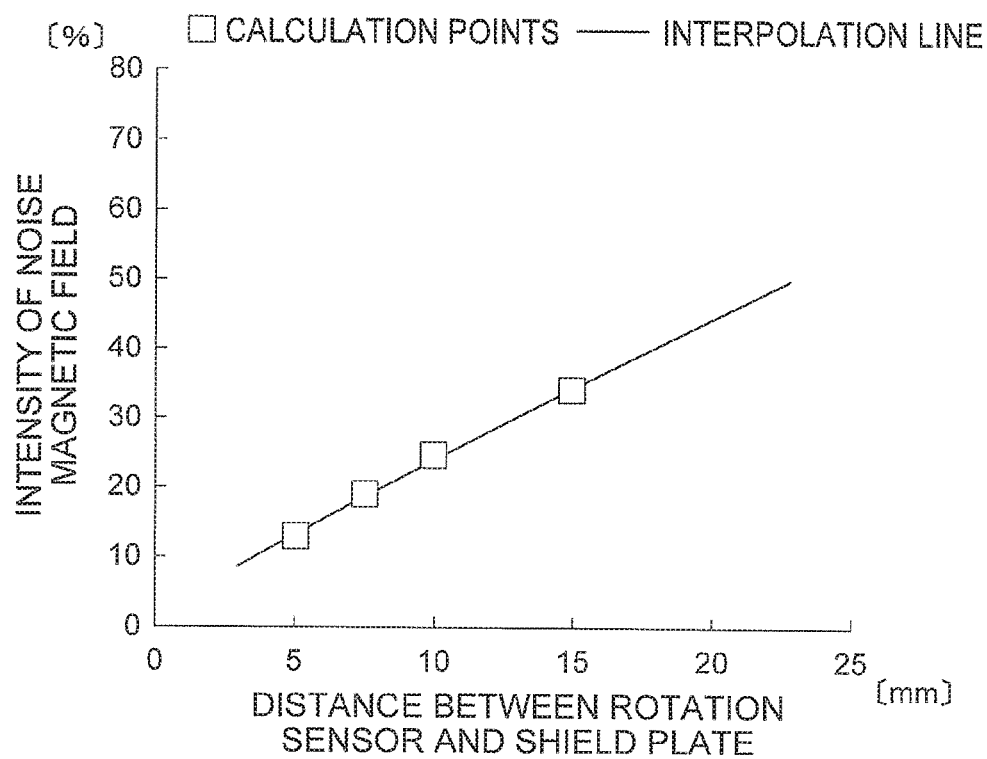
FIG. 13 is a graph showing the relationship between the z axis direction position of the shield plate and the intensity of the noise magnetic field at the origin when the rotation sensor and the respective feeder wires have the positional relationship shown in FIG. 7, according to the second embodiment of this invention.

FIG. 13 is a graph showing the relationship between the z axis direction position of the shield plate 46 and the intensity of the noise magnetic field at the origin when the rotation sensor 44 and the respective feeder wires 26 have the positional relationship shown in FIG. 7, according to the second embodiment of this invention. Note that in FIG. 13, maximum values of the absolute value of the noise magnetic field at the origin in a case where the shield plate 46 is disposed successively in four locations within the z coordinate range of 5 mm to 15 mm are indicated as the four calculation points. FIG. 13 also shows an interpolation line that interpolates the four calculation points by connecting the four calculation points smoothly. Furthermore, FIG. 13 shows the intensity of the noise magnetic field when the maximum value of the absolute value of the noise magnetic field in FIG. 9 is set at 100%.

It can be seen from FIG. 13 that even when the respective current phases of the feeder wires 26 differ by 30° between the U1 phase and the U2 phase, between the V1 phase and the V2 phase, and between the W1 phase and the W2 phase, the intensity of the noise magnetic field in the position of the rotation sensor 44 is reduced below 100% in FIG. 9 by disposing the shield plate 46 in a position on the z axis having a positive value. Further, comparing FIG. 10 and FIG. 13, it can be seen that when the respective current phases of the feeder wires 26 differ by 30° between the U1 phase and the U2 phase, between the V1 phase and the V2 phase, and between the W1 phase and the W2 phase, the noise magnetic field reduction effect obtained with the shield plate 46 improves over the first embodiment, in which the current phase differences between the corresponding phases of the feeder wires 26 are respectively set at 0°.

Hence, by disposing the shield plate 46 between the rotation sensor 44 and the inverter circuit 38, the intensity of the noise magnetic field in the position of the rotation sensor 44 can be reduced even when the respective current phase differences between the feeder wires 26 are set at 30° between the U1 phase and the U2 phase, between the V1 phase and the V2 phase, and between the W1 phase and the W2 phase. As a result, detection errors by the rotation sensor 44 can be reduced, whereby a reduction in the performance of the electric driving apparatus 7 can be suppressed. Moreover, the disposal freedom of the feeder wires 26 can be improved, thereby preventing an increase in the size of the electric driving apparatus 7.

Note that in the examples described above, as shown in FIG. 7, the positions of all of the groups of feeder wires 26, i.e. the group constituted by the U1 phase and the U2 phase, the group constituted by the V1 phase and the V2 phase, and the group constituted by the W1 phase and the W2 phase, are out of point symmetry with the axis P of the shaft 23 when seen in the axial direction of the shaft 23. As shown in FIG. 6, however, the positions of the respective groups of feeder wires 26, i.e. the group constituted by the U1 phase and the U2 phase, the group constituted by the V1 phase and the V2 phase, and the group constituted by the W1 phase and the W2 phase, when seen in the axial direction of the shaft 23 may be in point symmetry with the axis P of the shaft 23. As long as the respective current phases differences of the feeder wires 26 are set at 30° between the U1 phase and the U2 phase, between the V1 phase and the V2 phase, and between the W1 phase and the W2 phase, the noise magnetic fields from the respective feeder wires 26 are not completely canceled out in the position of the rotation sensor 44 even when the positions of the respective groups of feeder wires 26 are in point symmetry with the axis P of the shaft 23. Hence, even when the rotation sensor 44 and the respective feeder wires 26 have the positional relationship shown in FIG. 6, the intensity of the noise magnetic field in the position of the rotation sensor 44 can be reduced by the shield plate 46, and as a result, a noise magnetic field shielding effect can be obtained with the shield plate 46.

Third Embodiment

In the first embodiment, a current flows through each of the feeder wires 26, but some of the currents flowing through the respective feeder wires 26 may be permanently stopped. In this embodiment, of the currents flowing through the feeder wires 26 of the U1 phase, the V1 phase, the W1 phase, the U2 phase, the V2 phase, and the W2 phase, currents flow through the feeder wires 26 of the U1 phase, the V1 phase, and the W1 phase, but the currents flowing through the feeder wires 26 of the U2 phase, the V2 phase, and the W2 phase are permanently stopped. In other words, in this embodiment, three-phase power is supplied from the inverter circuit 38 to the first three-phase AC winding 48 alone, of the first and second three-phase AC windings 48, 49, while the power supply from the inverter circuit 38 to the second three-phase AC winding 49 is permanently stopped. All other configurations are identical to the first embodiment.

Figure 14:
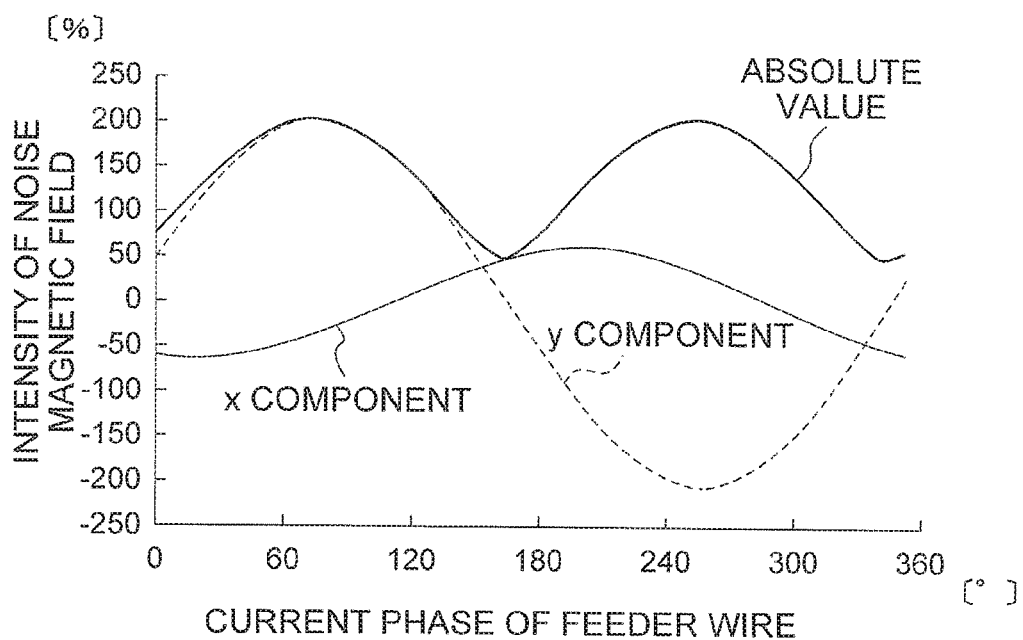
FIG. 14 is a graph showing the relationship between the current phase and the intensity of the noise magnetic field at the origin when the rotation sensor and the respective feeder wires have the positional relationship shown in FIG. 7, according to a third embodiment of this invention.

Next, the effect of the magnetic fields from the respective feeder wires 26 on the rotation sensor 44 in this embodiment when the rotation sensor 44 and the respective feeder wires 26 have the positional relationship shown in FIG. 7 will be described. FIG. 14 is a graph showing the relationship between the current phase and the intensity of the noise magnetic field at the origin when the rotation sensor 44 and the respective feeder wires 26 have the positional relationship shown in FIG. 7, according to the third embodiment of this invention. Similarly to FIGS. 8 and 9, FIG. 14 shows the absolute value of the noise magnetic field at the origin as the intensity of the noise magnetic field. Further, FIG. 14 shows the calculated intensity of the noise magnetic field in a hypothetical case where only the feeder wires 26 are disposed on the periphery of the rotation sensor 44. Moreover, FIG. 14 likewise shows the intensity of the noise magnetic field when the maximum value of the absolute value of the noise magnetic field in FIG. 9 is set at 100%.

Similarly to FIG. 9, it can be seen from FIG. 14 that when currents flow through the feeder wires 26 of the U1 phase, the V1 phase, and the W1 phase but the currents flowing through the feeder wires 26 of the U2 phase, the V2 phase, and the W2 phase are permanently stopped, the noise magnetic fields are not canceled out in the position of the rotation sensor 44, and therefore the noise magnetic fields from the respective feeder wires 26 cause the rotation sensor 44 to produce a detection error. Here, it is thought that by bringing the respective feeder wires 26 of the U1 phase, the V1 phase, and the W1 phase into contact with each other, the magnetic fields from the respective feeder wires 26 cancel each other out, leading to a reduction in the intensity of the noise magnetic field in the position of the rotation sensor 44. In this embodiment, however, the respective feeder wires 26 of the U1 phase, the V1 phase, and the W1 phase are disposed apart from each other, and it is therefore assumed that the intensity of the noise magnetic field increases in the position of the rotation sensor 44. In FIG. 14, the maximum value of the absolute value of the noise magnetic field in the position of the rotation sensor 44 is approximately 203% in comparison with FIG. 9.

Next, the shielding effect exerted by the shield plate 46 on the noise magnetic field in the position of the rotation sensor 44 according to this embodiment will be described. To confirm the shielding effect exerted on the noise magnetic field by the shield plate 46, the intensity of the noise magnetic field at the origin was calculated while passing currents through only the feeder wires 26 of the U1 phase, the V1 phase, and the W1 phase and varying the position of the shield plate 46 within a z coordinate range of 5 mm to 15 mm in a case where the rotation sensor 44 and the respective feeder wires 26 have the positional relationship shown in FIG. 7. Further, a flat plate 44 mm long, 44 mm wide, and 0.5 mm thick was used as the shield plate 46, and the shield plate 46 was disposed in a position where the z axis passed through the center of the flat plate. Furthermore, the intensity of the noise magnetic field was calculated with the shield plate 46 set in four positions (four calculation points) within the z coordinate range of 5 mm to 15 mm.

Figure 15:
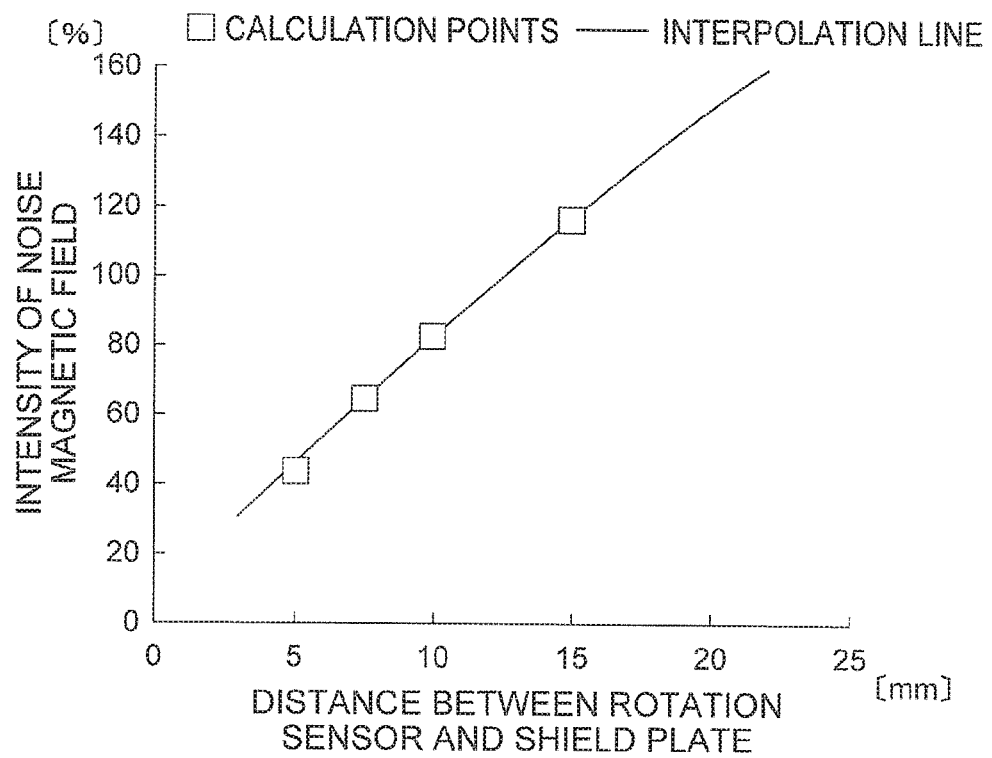
FIG. 15 is a graph showing the relationship between the z axis direction position of the shield plate and the intensity of the noise magnetic field at the origin when the rotation sensor and the respective feeder wires have the positional relationship shown in FIG. 7, according to the third embodiment of this invention.

FIG. 15 is a graph showing the relationship between the z axis direction position of the shield plate 46 and the intensity of the noise magnetic field at the origin when the rotation sensor 44 and the respective feeder wires 26 have the positional relationship shown in FIG. 7, according to the third embodiment of this invention. Note that in FIG. 15, maximum values of the absolute value of the noise magnetic field at the origin in a case where the shield plate 46 is disposed successively in four locations within the z coordinate range of 5 mm to 15 mm are indicated as the four calculation points. FIG. 15 also shows an interpolation line that interpolates the four calculation points by connecting the four calculation points smoothly. Note that FIG. 15 shows the intensity of the noise magnetic field when the maximum value of the absolute value of the noise magnetic field in FIG. 9 is set at 100%.

It can be seen from FIG. 15 that even when currents are passed through only the feeder wires 26 of the U1 phase, the V1 phase, and the W1 phase, the intensity of the noise magnetic field in the position of the rotation sensor 44 is reduced below approximately 203%, i.e. the maximum value of the absolute value of the noise magnetic field in FIG. 14, by disposing the shield plate 46 in a position on the z axis having a positive value. It can therefore be seen that a noise magnetic field reduction effect is obtained with the shield plate 46 likewise in the third embodiment, where currents are passed through only the feeder wires 26 of the U1 phase, the V1 phase, and the W1 phase.

Hence, by disposing the shield plate 46 between the rotation sensor 44 and the inverter circuit 38, the intensity of the noise magnetic field in the position of the rotation sensor 44 can be reduced even when currents are passed through the respective feeder wires 26 of the U1 phase, the V1 phase, and the W1 phase but the currents flowing through the respective feeder wires 26 of the U2 phase, the V2 phase, and the W2 phase are permanently stopped. As a result, detection errors by the rotation sensor 44 can be reduced, whereby a reduction in the performance of the electric driving apparatus 7 can be suppressed. Moreover, the disposal freedom of the feeder wires 26 can be improved, thereby preventing an increase in the size of the electric driving apparatus 7.

Further, the feeder wires 26 of the U1 phase, the V1 phase, the W1 phase, the U2 phase, the V2 phase, and the W2 phase are disposed apart from each other, and therefore the intensity of the noise magnetic field in the position of the rotation sensor 44 can be reduced by the shield plate 46 even without bringing the respective feeder wires 26 into contact with each other so that the noise magnetic fields therefrom cancel each other out. As a result, detection errors by the rotation sensor 44 can be reduced while improving the disposal freedom of the feeder wires 26.

Note that in the example described above, only the currents flowing through the feeder wires 26 of the U2 phase, the V2 phase, and the W2 phase, among the respective feeder wires 26 of the U1 phase, the V1 phase, the W1 phase, the U2 phase, the V2 phase, and the W2 phase, are permanently stopped, but this invention is not limited thereto, and the currents flowing through feeder wires 26 other than the feeder wires 26 of the U2 phase, the V2 phase, and the W2 phase may be permanently stopped. For example, the currents flowing through the feeder wires 26 of the U1 phase, the V1 phase, and the W1 phase may be permanently stopped, or the current flowing through the feeder wire 26 of the W2 phase alone may be permanently stopped. Likewise in this case, a noise magnetic field reduction effect is obtained with the shield plate 46.

Further, in the examples described above, the armature winding 33 includes the first and second three-phase AC windings 48, 49, but the armature winding 33 may be constituted by the first three-phase AC winding 48 alone or by the second three-phase AC winding 49 alone. In other words, the motor 8 may be a normal three-phase motor having a single three-phase AC winding as an armature winding. When the armature winding 33 is constituted by the first three-phase AC winding 48, the feeder wires 26 of the U1 phase, the V1 phase, and the W1 phase remain, while the feeder wires 26 of the U2 phase, the V2 phase, and the W2 phase are eliminated. When the armature winding 33 is constituted by the second three-phase AC winding 49, the feeder wires 26 of the U2 phase, the V2 phase, and the W2 phase remain, while the feeder wires 26 of the U1 phase, the V1 phase, and the W1 phase are eliminated.

Furthermore, in the example described above, the configuration in which some of the currents flowing through the respective feeder wires 26 are permanently stopped is applied to the configuration of the first embodiment, in which the current phase differences between the feeder wires 26 of the corresponding phases are set respectively at 0°, but instead, the configuration in which some of the currents flowing through the respective feeder wires 26 are permanently stopped may be applied to the configuration of the second embodiment, in which the current phase differences between the feeder wires 26 of the corresponding phases are set respectively at 30°.

Fourth Embodiment

Figure 16:
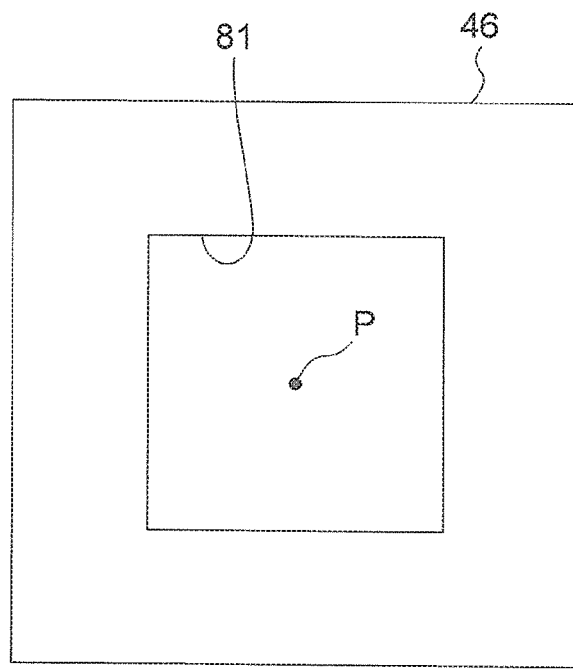
FIG. 16 is a front view showing the shield plate according to a fourth embodiment of this invention.

FIG. 16 is a front view showing the shield plate 46 according to a fourth embodiment of this invention. A shield through hole 81 is provided in the center of the shield plate 46. A sectional shape of the shield through hole 81 corresponds to the outer shape of the shield plate 46. In this example, a square flat plate that is 44 mm long, 44 mm wide, and 0.5 mm thick is used as the shield plate 46. Further, in this example, the shield through hole 81 has a square sectional shape that is 20 mm long and 20 mm wide. Furthermore, in this example, the shield plate 46 is disposed orthogonally to the axis P of the shaft 23 such that the axis P passes through the center of the shield plate 46. All other configurations are identical to the first embodiment.

Next, the shielding effect exerted by the shield plate 46 on the noise magnetic field in the position of the rotation sensor 44 according to this embodiment will be described. To confirm the shielding effect exerted on the noise magnetic field by the shield plate 46 in a case where the rotation sensor 44 and the respective feeder wires 26 have the positional relationship shown in FIG. 7, the shield plate 46 provided with the shield through hole 81 was disposed in a position having a z axis coordinate of 10 mm, whereupon the intensity of the noise magnetic field at the origin was calculated while varying the length of one side of the square cross-section of the shield through hole 81. Further, the intensity of the noise magnetic field was calculated with the length of one side of the square cross-section of the shield through hole 81 set at four different lengths (four calculation points) within a range of 0 mm to 40 mm.

Figure 17:
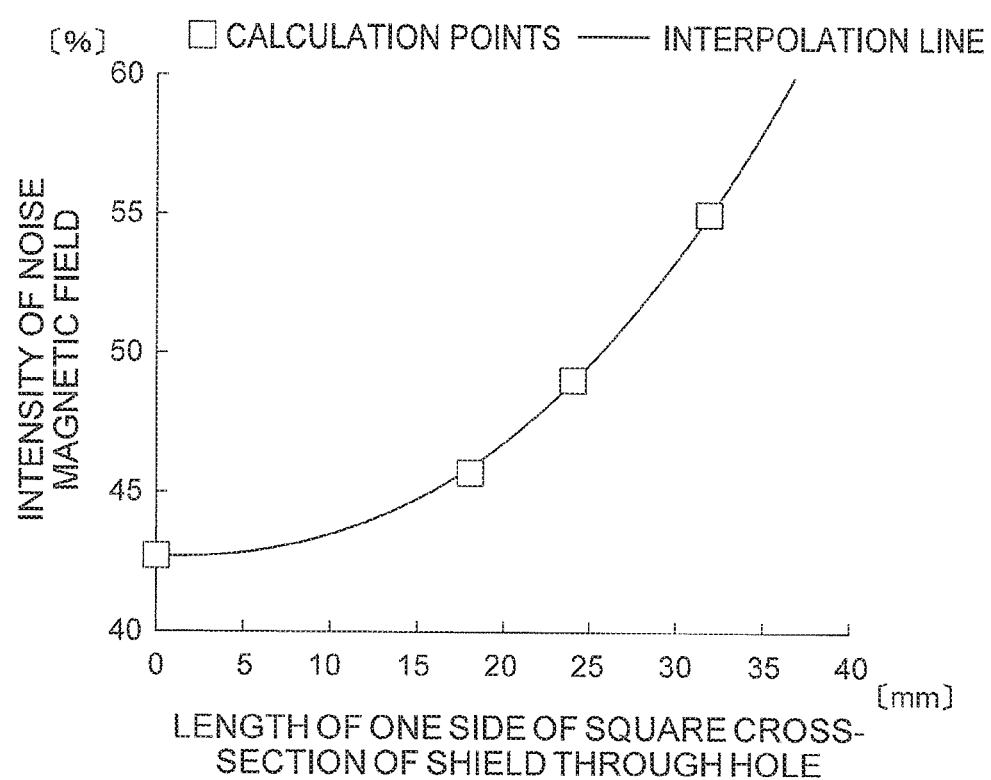
FIG. 17 is a graph showing the relationship between the z axis direction position of the shield plate and the intensity of the noise magnetic field at the origin when the rotation sensor and the respective feeder wires have the positional relationship shown in FIG. 7, according to the fourth embodiment of this invention.

FIG. 17 is a graph showing the relationship between the z axis direction position of the shield plate 46 and the intensity of the noise magnetic field at the origin when the rotation sensor 44 and the respective feeder wires 26 have the positional relationship shown in FIG. 7, according to the fourth embodiment of this invention. Note that FIG. 17 also shows an interpolation line that interpolates the four calculation points by connecting the four calculation points smoothly. Further, FIG. 17 shows the intensity of the noise magnetic field when the maximum value of the absolute value of the noise magnetic field in FIG. 9 is set at 100%.

It can be seen from FIG. 17 that even when the shield through hole 81 is provided in the shield plate 46, the intensity of the noise magnetic field in the position of the rotation sensor 44 is reduced by disposing the shield plate 46 in a position on the z axis having a positive value. It can also be seen from FIG. 17 that the intensity of the noise magnetic field at the origin varies gently in a range where the length of one side of the shield through hole 81 is no greater than a dimension (20 mm) close to half the length (44 mm) of one side of the square outer shape of the shield plate 46. It can therefore be seen that as long as the length of one side of the square cross-section of the shield through hole 81 is within a range not exceeding 20 mm, the noise magnetic field reduction effect obtained with the shield plate 46 is unlikely to deteriorate even when the shield through hole 81 is provided in the shield plate 46.

Hence, by disposing the shield plate 46 between the rotation sensor 44 and the inverter circuit 38, the intensity of the noise magnetic fields in the position of the rotation sensor 44 can be reduced even when the shield through hole 81 is provided in the shield plate 46. As a result, detection errors by the rotation sensor 44 can be reduced, whereby a reduction in the performance of the electric driving apparatus 7 can be suppressed. Moreover, the disposal freedom of the feeder wires 26 can be improved, thereby preventing an increase in the size of the electric driving apparatus 7.

Furthermore, when the sensor device 43 is fixed to the shield plate 46 or the shield plate 46 is fixed to the heat sink 37, for example, a shield through hole for use during fixing can be provided in the shield plate 46 while obtaining a noise magnetic field reduction effect with the shield plate 46. As a result, the shield plate 46 can be applied to the electric driving apparatus 7 easily.

Note that in the example described above, the shield through hole 81 has a square sectional shape, but this invention is not limited thereto, and the sectional shape of the shield through hole 81 may be circular or the like, for example. Further, in the example described above, the shield through hole 81 is provided in the shield plate 46 singly, but a plurality of shield through holes 81 may be provided in the shield plate 46. Moreover, in the example described above, the distance between the rotation sensor 44 and the shield plate 46 is set at 10 mm, but a noise magnetic field reduction effect can be obtained with the shield plate 46 even when the distance between the rotation sensor 44 and the shield plate 46 is set at a value other than 10 mm.

Furthermore, in the example described above, the shield plate 46 provided with the shield through hole 81 is applied to the configuration of the first embodiment, but may be applied to the configuration of the second or third embodiment.

Further, in the above embodiments, the shield plate 46 has a square outer shape, but this invention is not limited thereto, and the outer shape of the shield plate 46 may be circular or the like, for example. In other words, as long as the shield plate 46 has a function for collecting magnetic flux at a first end portion, among a first end portion and a second end portion of the outer shape of the shield plate 46, and a function for transmitting the magnetic flux collected at the first end portion to the second end portion as a magnetic path, the shield plate 46 can be expected to exert a noise magnetic field shielding effect on the rotation sensor 44 regardless of the outer shape of the shield plate 46.

Furthermore, in the above embodiments, the shield plate 46 is disposed at a remove from the heat sink 37, but this invention is not limited thereto, and the shield plate 46 may be disposed in contact with the heat sink 37 or embedded in the heat sink 37. When the shield plate 46 is embedded in the heat sink 37, an increase in the size of the electric driving apparatus 7 due to application of the shield plate 46 to the electric driving apparatus 7 can be prevented from occurring in the axial direction of the shaft 23.

The invention claimed is:

1. An electric driving apparatus comprising:
   a motor that includes a rotary shaft having a first end portion and a second end portion, a stator that includes an armature winding and is disposed around an axis of the rotary shaft, and a rotor that is fixed to the rotary shaft so as to rotate integrally with the rotary shaft relative to the stator;
   a sensor magnet fixed to the first end portion;
   a sensor device that opposes the sensor magnet in an axial direction of the rotary shaft, and includes a rotation sensor for detecting a magnetic field generated by the sensor magnet; and
   a control unit that is mounted on the motor and includes an inverter circuit connected to the armature winding via a plurality of feeder wires,
   wherein the inverter circuit is disposed in a position further from the sensor magnet than the rotation sensor in the axial direction of the rotary shaft,
   a shield plate formed from a magnetic material is disposed between the rotation sensor and the inverter circuit,
   the axis of the rotary shaft passes through a center of the shield plate,
   a shield through hole is provided in the center of the shield plate, and
   the shield through hole is disposed at a position away from the rotary shaft in the axial direction of the rotary shaft.

2. The electric driving apparatus according to claim 1, wherein, when seen along the axis of the rotary shaft, the sensor magnet is disposed within a region of the shield plate and the plurality of feeder wires are disposed outside the region of the shield plate.

3. The electric driving apparatus according to claim 1, wherein a distance between the shield plate and the rotation sensor in the axial direction of the rotary shaft is at least 7 mm.

4. The electric driving apparatus according to claim 1, wherein the armature winding includes first and second three-phase AC windings,
   feeder wires of a U1 phase, a V1 phase, and a W1 phase are connected to the first three-phase AC winding, feeder wires of a U2 phase, a V2 phase, and a W2 phase are connected to the second three-phase AC winding, respective current phase differences between the feeder wires are set at 0° between the U1 phase and the U2 phase, between the V1 phase and the V2 phase, and between the W1 phase and the W2 phase, and positions of the feeder wires of at least one group, among a group constituted by the U1 phase and the U2 phase, a group constituted by the V1 phase and the V2 phase, and a group constituted by the W1 phase and the W2 phase, are out of point symmetry with the axis of the rotary shaft when seen along the axis of the rotary shaft.

5. The electric driving apparatus according to claim 1, wherein the armature winding includes first and second three-phase AC windings, feeder wires of a U1 phase, a V1 phase, and a W1 phase are connected to the first three-phase AC winding, feeder wires of a U2 phase, a V2 phase, and a W2 phase are connected to the second three-phase AC winding, and respective current phase differences between the feeder wires are set at 30° between the U1 phase and the U2 phase, between the V1 phase and the V2 phase, and between the W1 phase and the W2 phase.

6. The electric driving apparatus according to claim 1, wherein the armature winding includes first and second three-phase AC windings, feeder wires of a U1 phase, a V1 phase, and a W1 phase are connected to the first three-phase AC winding, feeder wires of a U2 phase, a V2 phase, and a W2 phase are connected to the second three-phase AC winding, and some currents, among currents flowing through the feeder wires of the U1 phase, the V1 phase, the W1 phase, the U2 phase, the V2 phase, and the W2 phase, are permanently stopped.

7. The electric driving apparatus according to claim 1, wherein the armature winding includes a three-phase AC winding, and the plurality of feeder wires connected to the three-phase AC winding are disposed apart from each other.

* * * * *